(12) United States Patent
Kondoh

(10) Patent No.: US 12,288,535 B2
(45) Date of Patent: Apr. 29, 2025

(54) MULTI-SCREEN DISPLAY DEVICE AND LIQUID CRYSTAL DISPLAY MODULE FOR MULTI-SCREEN DISPLAY DEVICE

(71) Applicant: Sharp Display Technology Corporation, Kameyama (JP)

(72) Inventor: Kazuya Kondoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/413,288

(22) Filed: Jan. 16, 2024

(65) Prior Publication Data
US 2024/0265887 A1    Aug. 8, 2024

(30) Foreign Application Priority Data

Feb. 3, 2023    (JP) .................................. 2023-015109

(51) Int. Cl.
*G09G 3/36* (2006.01)
*G06F 3/14* (2006.01)

(52) U.S. Cl.
CPC ......... *G09G 3/3648* (2013.01); *G06F 3/1446* (2013.01); *G09G 2300/026* (2013.01); *G09G 2320/0247* (2013.01)

(58) Field of Classification Search
None
See application file for complete search history.

(56) References Cited

U.S. PATENT DOCUMENTS

| | | | |
|---|---|---|---|
| 2006/0017666 A1* | 1/2006 | Kim ..................... | G09G 3/3216 345/76 |
| 2009/0073154 A1* | 3/2009 | Lee ..................... | G09G 3/3696 345/94 |
| 2012/0194773 A1* | 8/2012 | Kim ..................... | G09G 3/3666 349/139 |
| 2015/0161928 A1* | 6/2015 | Kim ..................... | G09G 3/3225 345/1.3 |
| 2015/0279272 A1* | 10/2015 | Takahara ............. | G09G 3/3233 345/76 |
| 2016/0180793 A1* | 6/2016 | Kim ........................ | G09G 3/20 345/212 |
| 2017/0005298 A1* | 1/2017 | Ishizu .................... | H01L 22/20 |
| 2017/0076657 A1* | 3/2017 | Lu ......................... | G09G 3/2007 |
| 2018/0292691 A1* | 10/2018 | Chen ..................... | G02F 1/1362 |
| 2018/0314354 A1* | 11/2018 | Tang ..................... | G09G 3/3208 |
| 2019/0164489 A1* | 5/2019 | Zhang ................... | G09G 3/3258 |

(Continued)

FOREIGN PATENT DOCUMENTS

JP    2020-016841 A    1/2020

*Primary Examiner* — Sepehr Azari
(74) *Attorney, Agent, or Firm* — ScienBiziP, P.C.

(57) ABSTRACT

A liquid crystal display module for a multi-screen display device includes a liquid crystal display panel that includes a first gate driver connected to one ends of a plurality of gate bus lines and a second gate driver connected to other ends of the plurality of gate bus lines, and a control device. The control device receives, from a host computer, an image signal and an arrangement information signal indicating arrangement information of the liquid crystal display panel in the multi-screen display device, generates a gate signal from the image signal, and outputs the gate signal to one or both of the first gate driver and the second gate driver determined based on the arrangement information signal.

16 Claims, 21 Drawing Sheets

(56) References Cited

U.S. PATENT DOCUMENTS

| | | | |
|---|---|---|---|
| 2020/0111859 A1* | 4/2020 | Ko | H10K 59/131 |
| 2021/0097917 A1* | 4/2021 | Li | G09G 3/3266 |
| 2022/0215809 A1* | 7/2022 | Tung | G09G 3/3696 |
| 2023/0100946 A1* | 3/2023 | Li | G02F 1/13336 |
| | | | 349/42 |
| 2024/0027854 A1* | 1/2024 | Diao | G02F 1/136286 |
| 2024/0233675 A1* | 7/2024 | Li | G02F 1/1362 |

\* cited by examiner

MULTI-SCREEN DISPLAY DEVICE AND LIQUID CRYSTAL DISPLAY MODULE FOR MULTI-SCREEN DISPLAY DEVICE

CROSS-REFERENCE TO RELATED APPLICATIONS

This application claims the benefit of priority to Japanese Patent Application Number 2023-015109 filed on Feb. 3, 2023. The entire contents of the above-identified application are hereby incorporated by reference.

BACKGROUND

Technical Field

The disclosure relates to a multi-screen display device and a liquid crystal display module for the multi-screen display device.

A display device is known in which a plurality of liquid crystal display modules are arranged to display one image. In the present application, such a display device will be referred to as a multi-screen display device. The multi-screen display device is suitably used as a screen display device in a facility that accommodates a large number of spectators, or when performing large screen display, namely, when it is difficult to configure the display using one liquid crystal display module, such as for digital signage or the like. The multi-screen display device is also used as a portable device with a foldable screen. For example, JP 2020-16841 A discloses a method for generating a display image in such a multi-screen display device.

SUMMARY

When one image is displayed on a plurality of screens, a difference in display characteristics between the screens impairs a sense of integrity of the image and deteriorates the display quality. An object of the disclosure is to provide a multi-screen display device that can display an image with a high display quality, and a liquid crystal display module for the multi-screen display device.

A liquid crystal display module for a multi-screen display device according to an embodiment of the disclosure includes a liquid crystal display panel including a plurality of gate bus lines, a first gate driver connected to first ends of the plurality of gate bus lines, and a second gate driver connected to second ends of the plurality of gate bus lines, and a control device. The control device receives, from a host computer, an image signal, and an arrangement information signal indicating arrangement information of the liquid crystal display panel in the multi-screen display device, generates a gate signal from the image signal, and outputs the gate signal to one or both of the first gate driver and the second gate driver determined based on the arrangement information signal.

According to an embodiment of the disclosure, a multi-screen display device that can display an image with a high display quality and a liquid crystal display module for the multi-screen display device are provided.

BRIEF DESCRIPTION OF DRAWINGS

The disclosure will be described with reference to the accompanying drawings, wherein like numbers reference like elements.

DESCRIPTION OF EMBODIMENTS

Figure 1:
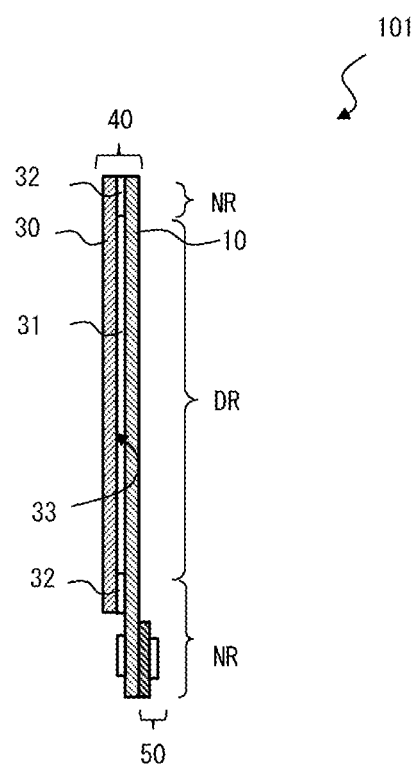
FIG. 1 is a schematic view illustrating a configuration of a liquid crystal display module for a multi-screen display device of a first embodiment.

In a known liquid crystal display module, when a gate output signal applied to a gate of a thin film transistor (TFT) of each pixel changes from a high level to a low level, a drain voltage rapidly decreases due to a parasitic capacitance of the TFT (also referred to as a field-through voltage, a feed-through voltage, or a pull-in voltage). Further, due to the parasitic capacitance of each of the pixels, the waveform of the gate output signal is rounded, and a delay occurs with the gate output signal. Since such an influence is superimposed by a plurality of the pixels arrayed on one gate bus line, the voltage applied to a liquid crystal cell of each of the pixels and an application timing of the voltage vary depending on the position of the pixel, and as a result, the display quality deteriorates. The variation in the display in the liquid crystal display module may not be noticeable by itself, but when the liquid crystal display module configures a multi-screen display device, the difference in the display between the liquid crystal display modules adjacent to each other may be noticeable.

For example, in a case where an image is displayed on a display screen of one liquid crystal display module with a right end region of the image displayed bright and a left end region of the image displayed dark, when the liquid crystal display module is used in a stand-alone manner, the difference in luminance between the right end region and the left end region is not easily recognized by a user. However, when two of the above-described liquid crystal display modules are arranged in the lateral direction, the regions having the difference in luminance are arranged adjacent to each other. Thus, the user can easily recognize the difference in luminance.

In light of such a problem as described above, the inventor of the present application has conceived a novel multi-screen display device and a novel liquid crystal display module for the multi-screen display device.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for the same portions or portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

FIG. 1 is a schematic view illustrating a configuration of a liquid crystal display module 101 for a multi-screen display device of the present embodiment. Hereinafter, the "liquid crystal display module for the multi-screen display device" will be abbreviated as the "liquid crystal display module" for convenience. In the present embodiment, the liquid crystal display module 101 includes a liquid crystal display panel 40 and a control device 50. The liquid crystal display panel 40 includes a TFT substrate 10, a counter substrate 30, and a liquid crystal layer 31 located between the TFT substrate 10 and the counter substrate 30.

The TFT substrate 10 includes a display region DR, and a non-display region NR located around the display region DR so as to surround the display region DR. The display region DR is a region that contributes to image display, and the non-display region is a region that does not display an image.

The TFT substrate 10 and the counter substrate 30 are bonded to each other by a seal 32 that is disposed in the non-display region NR, so as to have a predetermined gap therebetween, and the liquid crystal layer 31 is disposed between the TFT substrate 10 and the counter substrate 30 in a region surrounded by the seal 32. The control device 50 is disposed in the non-display region NR on a surface of the TFT substrate 10 on the opposite side of a surface of the TFT substrate 10 in contact with the liquid crystal layer 31. A common electrode (counter electrode) 33 is disposed on a surface of the counter substrate 30 on the liquid crystal layer 31 side. The common electrode 33 may be provided in the TFT substrate 10.

Figure 2:
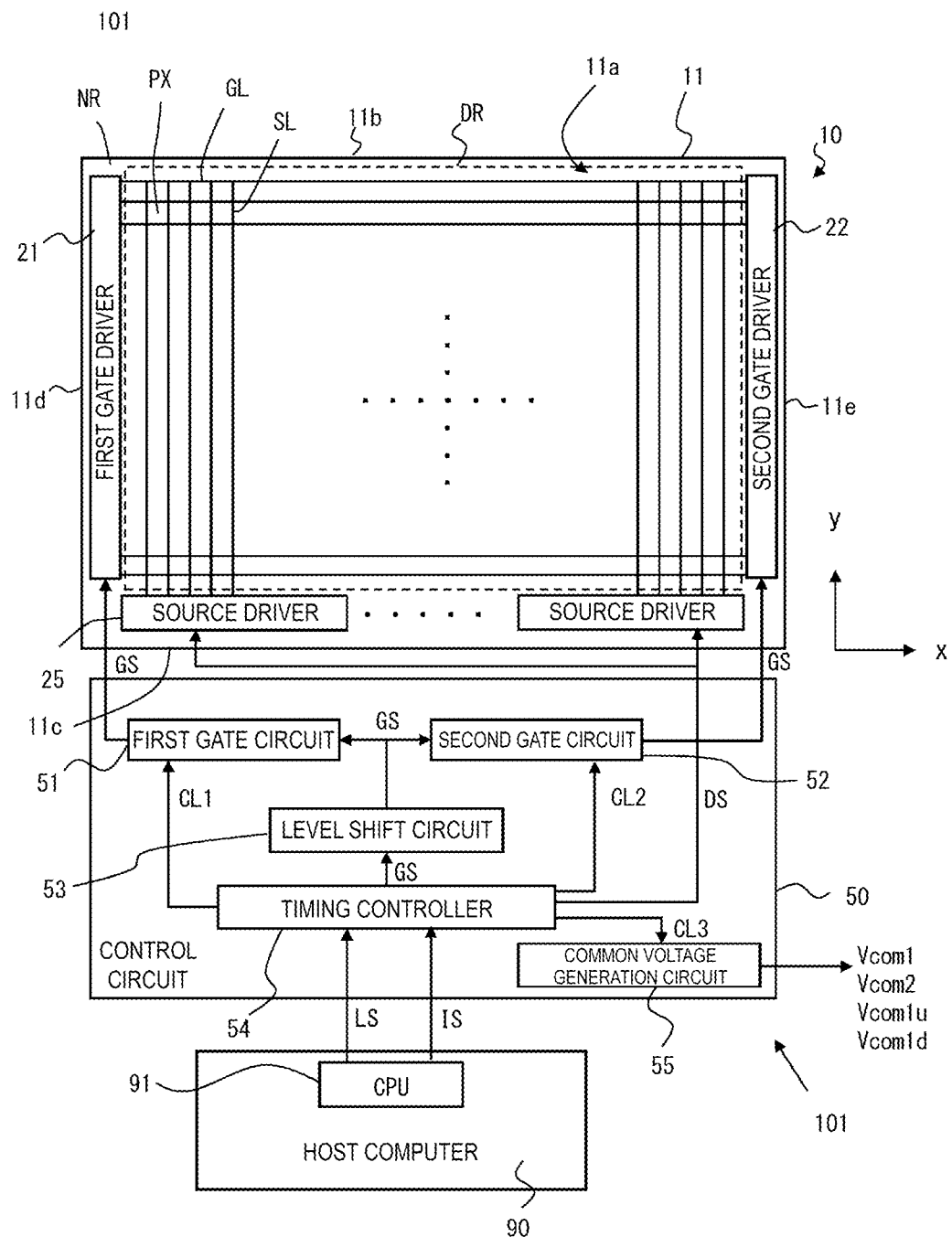
FIG. 2 is a schematic diagram illustrating a circuit configuration of a liquid crystal display panel.

FIG. 2 is a schematic diagram illustrating a circuit configuration of the liquid crystal display panel 40. The TFT substrate 10 of the liquid crystal display panel 40 further includes a substrate 11, a plurality of gate bus lines GL, a plurality of source bus lines SL, and a plurality of pixels PX.

The substrate 11 has a main surface 11a and includes the above-described display region DR and non-display region NR. In the present embodiment, the substrate 11 has a rectangular shape and includes sides 11b and 11c facing each other and sides 11d and 11e facing each other. The plurality of gate bus lines GL, the plurality of source bus lines SL, and the plurality of pixels PX are arranged in the display region DR. Specifically, in the display region DR, the plurality of gate bus lines GL extend in an x-axis direction that is a first direction, and are arrayed in a y-axis direction that is a second direction intersecting the first direction. The plurality of source bus lines SL extend in the y-axis direction and are arrayed in the x-axis direction. Main constituent elements of each of the pixels PX are disposed in a region surrounded by a pair of the gate bus lines GL adjacent to each other in the y-axis direction, and a pair of the source bus lines SL adjacent to each other in the x-axis direction. The plurality of pixels PX are two-dimensionally arranged in the x-axis direction and the y-axis direction.

Figure 3:
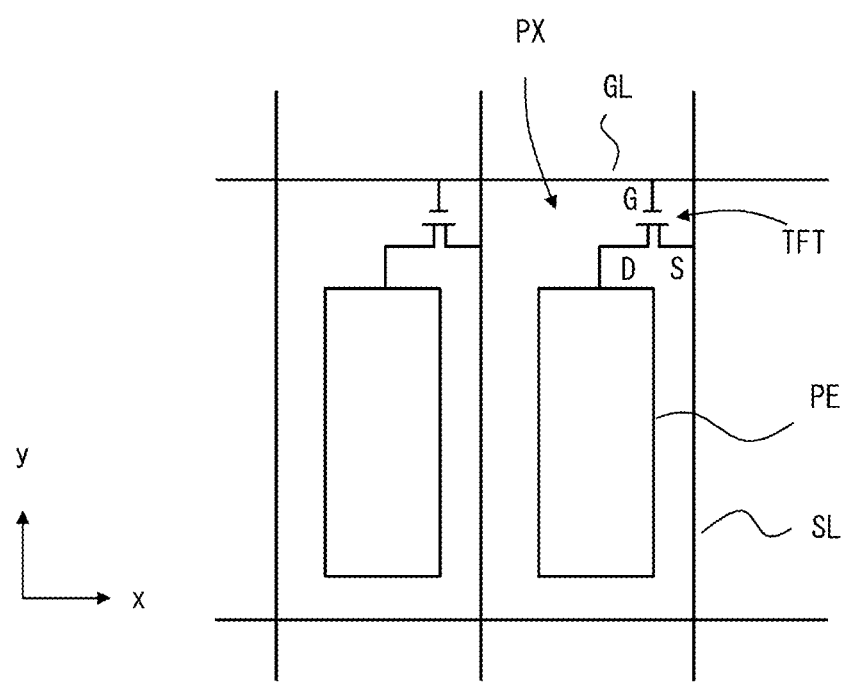
FIG. 3 is a circuit diagram illustrating a configuration of a pixel.

FIG. 3 is a circuit diagram illustrating a configuration of the pixel PX. Each of the pixels PX includes a pixel electrode PE, and a TFT that is a switching element. A gate electrode G of the TFT is connected to the gate bus line GL, a source electrode S thereof is connected to the source bus line SL, and a drain electrode D thereof is connected to the pixel electrode PE.

Each of the gate bus lines GL is connected to the gate electrode G of the TFT of each of the pixels PX arrayed in the x-axis direction, among the plurality of pixels PX. Further, each of the source bus lines SL is connected to the source electrode S of the TFT of each of the pixels PX arrayed in the y-axis direction, among the plurality of pixels PX.

As illustrated in FIG. 2, the TFT substrate 10 includes a first gate driver 21, a second gate driver 22, and a source driver 25, each of which is disposed in the non-display region NR.

Both ends of the plurality of gate bus lines GL extend to the non-display region NR, and one end thereof is connected to the first gate driver 21, and the other end thereof is connected to the second gate driver 22. In other words, each of the gate bus lines GL is connected to both the first gate driver 21 and the second gate driver 22. For example, the first gate driver 21 is disposed adjacent to the side 11d, and the second gate driver 22 is disposed adjacent to the side 11e.

The first gate driver 21 and the second gate driver 22 are integrally (monolithically) formed in the substrate 11. For example, the first gate driver 21 and the second gate driver 22 include a plurality of TFTs, and these TFTs and the TFTs of the pixels PX are formed at the same time. The first gate driver 21 and the second gate driver 22 may each be constituted by a bare chip or a packaged chip, and may be mounted in the non-display region NR of the substrate 11.

One end of each of the plurality of source bus lines SL extends to the non-display region NR, and is connected to the source driver 25 disposed in the non-display region NR. The source driver 25 is constituted by a bare chip or a packaged chip, and is mounted in the non-display region NR of the substrate 11. A part of the function of the source driver 25 may be formed in the non-display region NR, and the remaining circuit configuration may be formed in the control device 50. For example, of the source driver 25, only a demultiplexer circuit, which can receive a display data signal serially including red-green-blue (RGB) information of one pixel and can output the RGB information in a parallel manner, may be disposed in the TFT substrate 10, and the remaining circuit may be disposed in the control device 50. In this case, the demultiplexer circuit may be integrally formed in the substrate 11.

The control device 50 includes a timing controller 54, a level shift circuit 53, a first gate circuit 51, a second gate circuit 52, and a common voltage generation circuit 55.

From a host computer 90 including a central processing unit (CPU) 91, the timing controller 54 receives an image signal IS, and an arrangement information signal LS indicating arrangement information of a liquid crystal display panel in a multi-screen display device. The timing controller 54 generates a gate signal GS and a display data signal DS based on the image signal IS received from the host computer 90. The gate signal GS is output to the level shift circuit 53, and the display data signal DS is output to the source driver 25.

Further, the timing controller 54 generates, from the arrangement information signal LS, at least one of a first gate circuit control signal CL1 and a second gate circuit control signal CL2, and outputs each of the signal (s) to a corresponding one of the first gate circuit 51 and the second gate circuit 52. Furthermore, the timing controller 54 generates, from the arrangement information signal LS, a common voltage generation circuit control signal CL3, and outputs the signal to the common voltage generation circuit 55.

The gate signal GS is input to the first gate circuit 51 and the second gate circuit 52 via the level shift circuit 53 for adjusting the high level.

The first gate circuit 51 is, for example, an AND circuit, and receives the first gate circuit control signal CL1 and the gate signal GS. In the first gate circuit 51, the AND condition is satisfied only when the first gate circuit 51 receives the first gate circuit control signal CL1. Thus, only in this case, the first gate circuit 51 outputs the gate signal GS to the first gate driver 21. In other words, the first gate circuit 51 selectively outputs the gate signal GS based on the first gate circuit control signal CL1.

Similarly, the second gate circuit 52 is also an AND circuit, and receives the second gate circuit control signal CL2 and the gate signal GS. In the second gate circuit 52, the AND condition is satisfied only when the second gate circuit 52 receives the second gate circuit control signal CL2. Thus, only in this case, the second gate circuit 52 outputs the gate signal GS to the second gate driver 22. In other words, the second gate circuit 52 selectively outputs the gate signal GS based on the second gate circuit control signal CL2.

The common voltage generation circuit 55 receives the common voltage generation circuit control signal CL3, and outputs a reference voltage Vcom1 or a reference voltage Vcom2 based on the common voltage generation circuit control signal CL3. As will be described in detail below, when only one of the first gate circuit control signal CL1 and the second gate circuit control signal CL2 is generated, the reference voltage Vcom1 is output. When both the first gate circuit control signal CL1 and the second gate circuit control signal CL2 are generated, the reference voltage Vcom2 is output. The reference voltage Vcom1 or the reference voltage Vcom2 is applied to the common electrode 33.

In this manner, the control device 50 receives the image signal IS and the arrangement information signal LS from the host computer 90, and generates the gate signal GS from the image signal IS. Further, the control device 50 outputs the gate signal GS to one or both of the first gate driver 21 and the second gate driver 22, which is determined based on the arrangement information signal LS.

Figure 4:
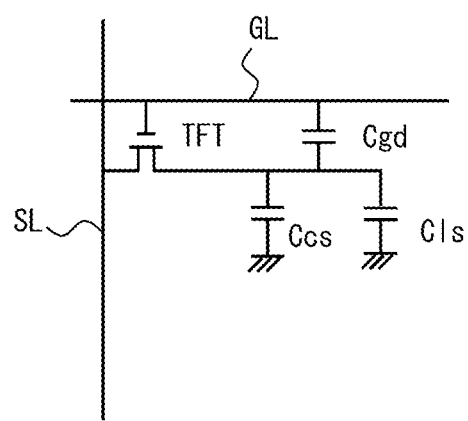
FIG. 4 is an equivalent circuit diagram of the pixel.

Next, an illumination timing of each of the pixels and variation in luminance among the pixels in the liquid crystal display module will be described. FIG. 4 is a diagram illustrating an equivalent circuit of the pixel PX. In each of the pixels of the liquid crystal display module, during one frame period, the gate output signal is set to a high level Vgh to turn on the TFT, and a signal voltage is applied from the source bus line to the pixel electrode to charge the pixel. Thereafter, the gate output signal is switched to a low level Vgl to turn off the TFT and hold the charge. Ideally, since the charges accumulated in an auxiliary capacitance Ccs and a pixel capacitance Cls are maintained, the voltage applied to the pixel electrode is maintained. However, in actuality, since a gate-drain parasitic capacitance Cgd of the TFT is present, the voltage of the pixel electrode decreases by $\Delta V$ (feed-through voltage described above), as expressed in the following Expression (1).

[Mathematical Expression 1]

$$\Delta V \frac{Cgd}{Cls + Ccs + Cgd}(VghVgl) \qquad (1)$$

In general, in the liquid crystal display module, in order to prevent deterioration of liquid crystal due to a DC bias component, a voltage whose polarity with respect to a voltage Vcom of the common electrode is inverted is applied to the pixel electrode for each frame. The voltage Vcom is determined so that the DC bias component applied to the pixel becomes zero. However, as described above, when the voltage of the pixel electrode decreases by $\Delta V$ when the TFT is turned off, as a result of the voltage of the pixel electrode shifting, the DC bias component is generated. In other words, when a positive voltage and a negative voltage are applied to the liquid crystal layer, the absolute values of the voltages applied to the liquid crystal layer do not coincide with each other. As a result, flicker occurs.

The influence of the feed-through voltage $\Delta V$ is markedly observed in the pixel in close proximity to the gate driver. In contrast, the farther the pixel from the gate driver, the more rounded the change waveform of the voltage of the gate output signal becomes due to a distributed constant circuit, which is constituted by the resistor of the gate bus line and the capacitance of the pixel connected to the gate bus line, and the like. In other words, the voltage gradually changes from Vgh to Vgl. Therefore, the value and the change speed of the feed-through voltage $\Delta V$ generated according to Expression (1) vary depending on the distance from the gate driver driving the gate bus line. Specifically, the closer the pixel to the gate bus line, the larger the value of $\Delta V$, and the farther the pixel from the gate bus line, the smaller the value of $\Delta V$.

In order to reduce the influence of the feed-through voltage $\Delta V$, the voltage Vcom of the common electrode may be lowered in accordance with the feed-through voltage $\Delta V$. However, as described above, the magnitude of the feed-through voltage $\Delta V$ varies depending on the distance of the gate bus line from the gate driver. Since the voltage applied to the common electrode can only be set to the same value for the entire liquid crystal layer, both the position and the value of the voltage Vcom with which the influence of the flicker can be reduced over the widest range are determined.

Figure 5A:
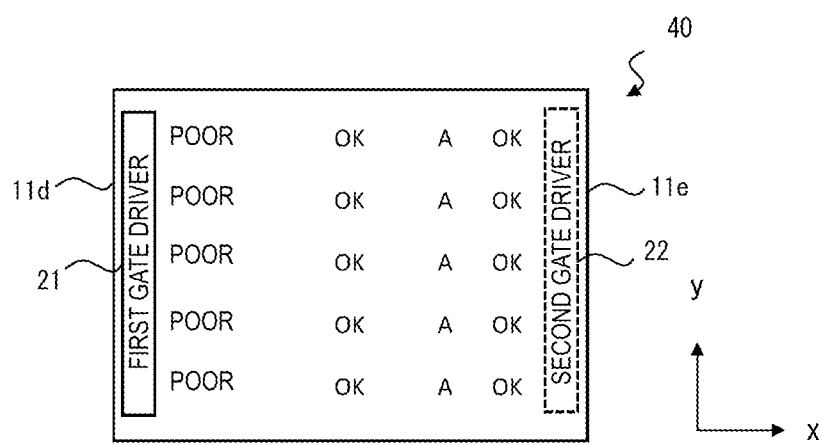
FIG. 5A is a schematic in-plane distribution diagram of an occurrence of flicker in the liquid crystal display panel.

FIG. 5A illustrates a setting example in which the influence of flicker can be reduced in a wide range when the gate signal GS is input to the first gate driver 21 to drive the gate bus lines in the liquid crystal display panel 40. In the example illustrated in FIG. 5A, the first gate driver 21 outputs the gate output signal to the gate bus lines. In this case, a voltage Vcom1 is applied to the common electrode. The voltage Vcom1 is obtained by subtracting, from the voltage Vcom of the common electrode, a voltage value corresponding to a feed-through voltage value $\Delta V_A$ at a position farthest from the first gate driver 21, that is, a position A between a position in close proximity to the side 11e and the center of the liquid crystal display panel 40 in the x-axis direction in which the gate bus lines extend. In this case, since the feed-through voltage $\Delta V$ that is larger than $\Delta V_A$ is generated in the pixel in close proximity to the first gate driver 21, the DC bias component applied to the pixel remains, and the flicker occurs (indicated by POOR in the drawing). In contrast, at a position at or in the vicinity of the center between the side 11d and the side 11e of the liquid crystal display panel 40 and at a position farther away from the first gate driver 21 than the position around the center, the feed-through voltage is canceled out, so the DC-bias component becomes substantially zero and the flicker becomes less noticeable. As a result, deterioration in the display quality due to the flicker is suppressed (indicated by OK in the drawing).

Figure 5B:
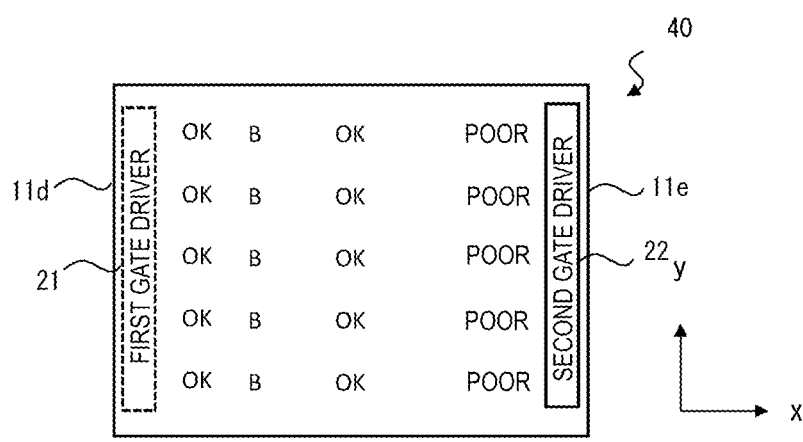
FIG. 5B is a schematic in-plane distribution diagram of an occurrence of the flicker in the liquid crystal display panel.

FIG. 5B illustrates a setting example in which the influence of flicker can be reduced in a wide range when the gate signal GS is input to the second gate driver 22 to drive the gate bus lines in the liquid crystal display panel 40. In the example illustrated in FIG. 5B, the second gate driver 22 outputs the gate output signal to the gate bus lines. In this case, a voltage is applied to the common electrode. The voltage is obtained by subtracting, from the voltage Vcom of the common electrode, a voltage value corresponding to a feed-through voltage value $\Delta V_B$ at a position farthest from the second gate driver 22, that is, a position B between a position in close proximity to the side 11d and the center of the liquid crystal display panel 40 in the x-axis direction in which the gate bus lines extend. Since the distance from the second gate driver 22 to the position B is the same as the distance from the first gate driver 21 to the position A, $\Delta V_B$ is equal to $\Delta V_A$. Therefore, the voltage applied to the common electrode is also equal to the voltage Vcom1. In this case also, since the feed-through voltage $\Delta V$ that is larger than $\Delta V_B$ is generated in the pixel in close proximity to the second gate driver 22, the DC bias component applied to the pixel remains, and the flicker occurs. In contrast, at the position at or in the vicinity of the center between the side 11d and the side 11e of the liquid crystal display panel 40 and at a position farther away from the second gate driver 22 than the position around the center, the flicker is less noticeable. As a result, the deterioration in the display quality due to the flicker is suppressed to a greater extent the farther the pixel is from the second gate driver 22 (indicated by OK in the drawing).

Figure 5C:
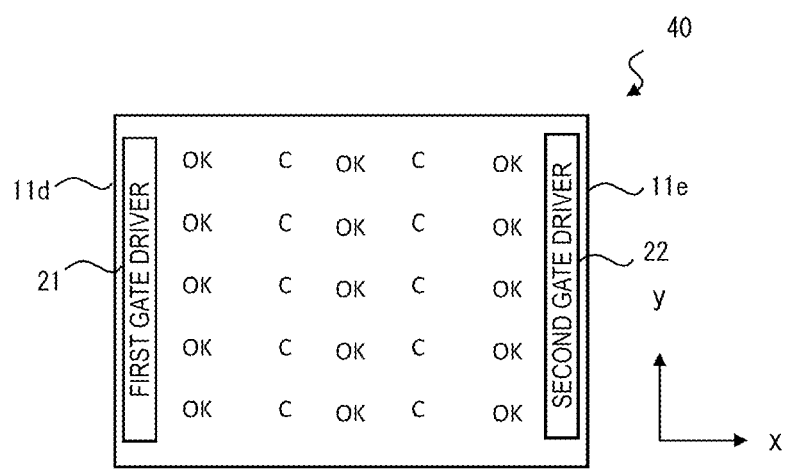
FIG. 5C is a schematic in-plane distribution diagram of an occurrence of the flicker in the liquid crystal display panel.

FIG. 5C illustrates a setting example in which the influence of flicker can be reduced in a wide range when the gate signals GS are input to both the first gate driver 21 and the second gate driver 22 to drive the gate bus lines in the liquid crystal display panel 40. When both the first gate driver 21 and the second gate driver 22 output the gate output signals to the gate bus lines, a voltage Vcom2 is applied to the common electrode. The voltage Vcom2 is obtained by subtracting, from the voltage Vcom of the common electrode, a voltage value corresponding to a feed-through voltage value $\Delta V_C$ at a position C between the center of the liquid crystal display panel 40 and the side 11d or the side 11e in the x-axis direction in which the gate bus lines extend. In this case, the generated feed-through voltage $\Delta V$ can be canceled out at almost all the positions on the gate bus lines. Therefore, as illustrated in FIG. 5C, it is possible to suppress the deterioration in the display quality due to the flicker over substantially the entire surface of the display region. However, when both the first gate driver 21 and the second gate driver 22 are driven, power consumption increases.

As illustrated in FIGS. 5A and 5B, when the gate output signal is input to the gate bus lines GL from one side, a difference in the display quality due to the flicker occurs at both ends in the left-right direction of the liquid crystal display module 101. By selecting which of the first gate driver 21 and the second gate driver 22 outputs the gate output signal based on the arrangement information signal received from the host computer 90, the liquid crystal display module 101 of the present embodiment adjusts the position of a region where the deterioration in the display quality due to the flicker in the multi-screen display device is noticeable.

For example, in a multi-screen display device, the central region of the screen is more noticeable to the user. Therefore, the deterioration in the display quality due to the flicker in the central region of the screen is suppressed. On the other hand, the user does not pay so much attention to the peripheral region of the screen. Thus, even if the display quality deteriorates in the peripheral region, the deterioration is not likely to be noticeable to the user, and the display quality of the entire screen does not deteriorate to a significant extent.

Further, in a case where a plurality of the liquid crystal display modules 101 are arranged, if the display qualities in regions of two of the adjacent liquid crystal display modules 101 are significantly different from each other, a boundary along which the display qualities are different from each other appears, and the difference becomes noticeable to the user. Therefore, the difference in the display quality is reduced between the adjacent regions of the two adjacent liquid crystal display modules 101.

On the other hand, as illustrated in FIG. 5C, when both the first gate driver 21 and the second gate driver 22 output the gate output signals, the deterioration in the display quality due to the flicker is suppressed in the entire liquid crystal display module 101. However, since the power consumption is increased as a result of driving the two gate drivers, it is preferable to reduce the number of liquid crystal display modules 101 that use this control.

As described above, when only one of the first gate driver 21 and the second gate driver 22 outputs the gate output signal, the voltage Vcom1 is applied to the common electrode 33, and when both the first gate driver 21 and the second gate driver 22 output the gate output signals, the voltage Vcom2 is applied to the common electrode 33. In other words, a set value of the voltage applied to the common electrode is made different according to the number of gate drivers to be driven.

In this manner, the liquid crystal display module 101 of the present embodiment adjusts the region where the display quality deteriorates in the liquid crystal display module 101 based on the arrangement information signal indicating where the liquid crystal display module 101 is arranged in the multi-screen display device. As a result, when the multi-screen display device is configured, the deterioration in the display quality of the entire screen can be suppressed while the power consumption is suppressed.

Figure 6:
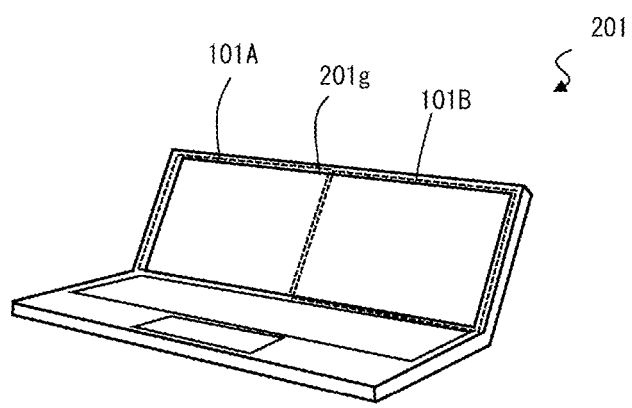
FIG. 6 is a schematic perspective view illustrating a multi-screen display device of the first embodiment.
Figure 7:
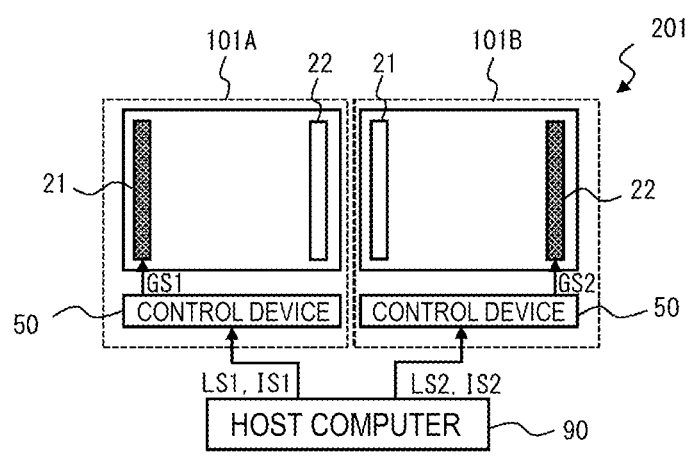
FIG. 7 is a schematic view illustrating a configuration of the multi-screen display device of the first embodiment.

Next, a multi-screen display device of the present embodiment will be described with reference to FIGS. 2, 6 and 7. FIG. 6 is a schematic perspective view illustrating a multi-screen display device 201 of the present embodiment, and FIG. 7 is a schematic view illustrating a configuration of the multi-screen display device 201. The multi-screen display device 201 is, for example, a laptop computer.

The multi-screen display device 201 includes a first liquid crystal display module 101A, a second liquid crystal display module 101B, and the host computer 90.

The multi-screen display device 201 includes an integrated screen 201g, and the first liquid crystal display module 101A and the second liquid crystal display module 101B are arranged so that display screens of the first liquid crystal display module 101A and the second liquid crystal display module 101B are arranged side by side on the screen 201g.

Each of the first liquid crystal display module 101A and the second liquid crystal display module 101B is the liquid crystal display module 101 described above. Further, in the present embodiment, the display region DR of the first liquid crystal display module 101A and the display region DR of the second liquid crystal display module 101B have the same shape and the same size. As illustrated in FIG. 7, the first liquid crystal display module 101A and the second liquid crystal display module 101B are arranged side by side such that the second gate driver 22 of the first liquid crystal display module 101A is adjacent to the first gate driver 21 of the second liquid crystal display module 101B.

Although the control devices 50 are illustrated in FIG. 7 in order to show the signal flow, the control devices 50 are actually disposed on the back side of the liquid crystal display modules and are not adjacent to the display regions. Further, in FIG. 7, the first gate driver 21 and/or the second gate driver 22 to be driven are indicated by shading.

For the first liquid crystal display module 101A, the host computer 90 drives the first gate driver 21 and pauses the second gate driver 22 to display an image on the first liquid crystal display module 101A. Further, for the second liquid crystal display module 101B, the host computer 90 drives the second gate driver 22 and pauses the first gate driver 21 to display an image on the second liquid crystal display module 101B.

More specifically, the host computer 90 generates a first image signal IS1, a second image signal IS2, a first arrangement information signal LS1, and a second arrangement information signal LS2, and outputs the first image signal IS1 and the first arrangement information signal LS1 to the first liquid crystal display module 101A, and outputs the second image signal IS2 and the second arrangement information signal LS2 to the second liquid crystal display module 101B. For example, the arrangement information signals are determined as shown in Table 1. In the present embodiment, since the first liquid crystal display module 101A and the second liquid crystal display module 101B are arranged in one row and two columns, the first arrangement information signal LS1 is "3" and the second arrangement information signal LS2 is "4". The arrangement information signal may actually be, for example, a 4-bit digital signal. The first image signal IS1 and the second image signal IS2 are image signals corresponding to a left-half image and a right half image of the one screen 201g, respectively.

TABLE 1

| Number of screens | Screen arrangement | Arrangement position | Arrangement information signal | Gate driver to be driven |
|---|---|---|---|---|
| 1 | Single | — | 0 | First and second |
| 2 | Two rows and one column | Upper | 1 | First and second |
|   |   | Lower | 2 | First or second |
|   | One row and two columns | Left | 3 | First |
|   |   | Right | 4 | Second |
| 4 | Two rows and two columns | Upper left | 5 | First |
|   |   | Upper right | 6 | Second |
|   |   | Lower left | 7 | First |
|   |   | Lower right | 8 | Second |
| 6 | Two rows and three columns | Upper left | 9 | First |
|   |   | Upper middle | 10 | First and second |
|   |   | Upper right | 11 | Second |
|   |   | Lower left | 12 | First |
|   |   | Lower middle | 13 | First and second |
|   |   | Lower right | 14 | Second |

The timing controller 54 (FIG. 2) of the control device 50 in each of the first liquid crystal display module 101A and the second liquid crystal display module 101B stores, for example, a table indicating a correspondence relationship between the value of the arrangement information signal and the driver to be driven shown in Table 1. Each of the control devices 50 selectively drives the first gate driver 21 and the second gate driver 22 in accordance with this table. Further, as described above, the voltage value to be applied to the common electrode 33 is set in accordance with the number of gate drivers to be driven.

More specifically, the control device 50 of the first liquid crystal display module 101A receives the first image signal IS1 and the first arrangement information signal LS1 from the host computer 90, and generates a first gate signal GS1 from the first image signal IS1. Further, by generating the first gate circuit control signal CL1 based on the correspondence relationship in the table, the control device 50 outputs the first gate signal GS1 from the first gate circuit 51 to the first gate driver 21.

Similarly, the control device 50 of the second liquid crystal display module 101B receives the second image signal IS2 and the second arrangement information signal LS2 from the host computer 90, and generates a second gate signal GS2 from the second image signal IS2. Further, by generating the second gate circuit control signal CL2 based on the correspondence relationship in the table, the control device 50 outputs the second gate signal GS2 from the second gate circuit 52 to the second gate driver 22.

As a result, display for which the influence of the flicker has been reduced can be performed in the central region of the screen 201g. In the central region, the first liquid crystal display module 101A and the second liquid crystal display module 101B are adjacent to each other. However, since both the liquid crystal display modules can display an image with good display quality in which the flicker is suppressed, the boundary between the two liquid crystal display modules is unlikely to become noticeable. Further, a left end region of the first liquid crystal display module 101A and a right end region of the second liquid crystal display module 101B are more likely to be influenced by the flicker than the central region since those regions are close to an operating gate driver. However, such a deterioration in the display quality is unlikely to become noticeable, since such regions are in the periphery of the screen 201g. Furthermore, since only one of the two gate drivers is driven in the first liquid crystal display module 101A and the second liquid crystal display module 101B, the power consumption in the multi-screen display device 201 can be reduced.

Second Embodiment

Figure 8:
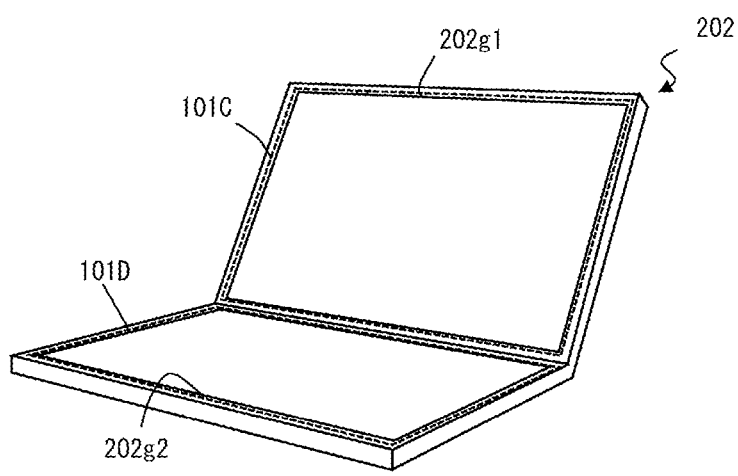
FIG. 8 is a schematic perspective view illustrating a multi-screen display device of a second embodiment.
Figure 9:
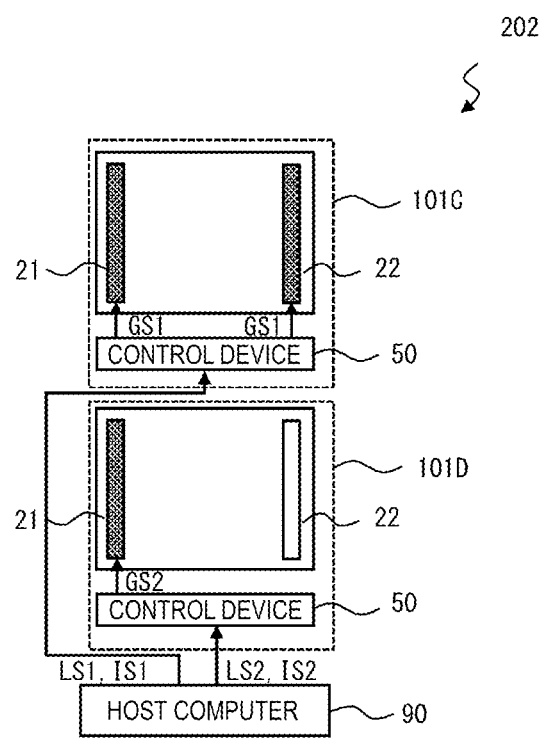
FIG. 9 is a schematic view illustrating a configuration of the multi-screen display device of the second embodiment.

A multi-screen display device of the present embodiment will be described. FIG. 8 is a schematic perspective view illustrating a multi-screen display device 202 of the present embodiment, and FIG. 9 is a schematic view illustrating a configuration of the multi-screen display device 202. The multi-screen display device 202 is a two-screen laptop computer.

The multi-screen display device 202 includes a first liquid crystal display module 101C, a second liquid crystal display module 101D, and the host computer 90.

The multi-screen display device 202 includes a screen 202g1 and a screen 202g2. The first liquid crystal display module 101C is disposed in the screen 202g1, and the second liquid crystal display module 101D is disposed in the screen 202g2. For example, content provided by an operating program is displayed on the screen 202g1, and, for example, a software keyboard is displayed on the screen 202g2.

Each of the first liquid crystal display module 101C and the second liquid crystal display module 101D is the liquid crystal display module 101 described in the first embodiment. Further, the display region DR of the first liquid crystal display module 101C and the display region DR of the second liquid crystal display module 101D have the same shape and the same size. The second liquid crystal display module 101D preferably further has a touch panel function.

As illustrated in FIG. 9, the first liquid crystal display module 101C and the second liquid crystal display module 101D are arranged such that the first gate driver 21 of the first liquid crystal display module 101C and the first gate driver 21 of the second liquid crystal display module 101D are arranged on the same straight line orthogonal to the direction in which the gate bus lines extend.

The host computer 90 drives both the first gate driver 21 and the second gate driver 22 to display an image on the first liquid crystal display module 101C. Further, the host computer 90 drives one of the first gate driver 21 and the second gate driver 22 and pauses the other thereof, to display an image on the second liquid crystal display module 101D.

More specifically, the host computer 90 generates the first image signal IS1, the second image signal IS2, the first arrangement information signal LS1, and the second arrangement information signal LS2, and outputs the first image signal IS1 and the first arrangement information signal LS1 to the first liquid crystal display module 101C, and outputs the second image signal IS2 and the second arrangement information signal LS2 to the second liquid crystal display module 101D. For example, the arrangement information signals are determined as shown in Table 1. In the present embodiment, since the first liquid crystal display module 101C and the second liquid crystal display module 101D are arranged in two rows and one column, the first arrangement information signal LS1 is "1" and the second arrangement information signal LS2 is "2". The first image signal IS1 is an image signal corresponding to an image to be displayed on the screen 202g1, such as an image of content, and the second image signal IS2 is, for example, an image signal representing a software keyboard.

As in the first embodiment, the timing controller 54 (FIG. 2) of the control device 50 in each of the first liquid crystal display module 101C and the second liquid crystal display module 101D stores a table indicating the correspondence relationship between the value of the arrangement information signal and the driver to be driven shown in Table 1. Each of the control devices 50 selectively drives the first gate driver 21 and the second gate driver 22 in accordance with this table.

More specifically, the control device 50 of the first liquid crystal display module 101C receives the first image signal IS1 and the first arrangement information signal LS1 from the host computer 90, and generates the first gate signal GS1 from the first image signal IS1. By generating the first gate circuit control signal CL1 and the second gate circuit control signal CL2 based on the correspondence relationship in the table, the control device 50 outputs the first gate signal GS1 to the first gate driver 21 and the second gate driver 22.

Further, the control device 50 of the second liquid crystal display module 101D receives the second image signal IS2 and the second arrangement information signal LS2 from the host computer 90, and generates the second gate signal GS2 from the second image signal IS2. By generating the first gate circuit control signal CL1 or the second gate circuit control signal CL2 based on the correspondence relationship in the table, the control device 50 outputs the second gate signal GS2 to only one of the first gate driver 21 and the second gate driver 22. FIG. 9 illustrates an example in which the control device 50 outputs the second gate signal GS2 to the first gate driver 21.

As a result, two of the gate drivers are driven in the screen 202g1, and display for which the influence of the flicker has been reduced can be performed as a whole. On the other hand, with respect to the keyboard displayed on the screen 202g2, even if the display quality deteriorates to some extent, there is no significant impact on the function as the software keyboard. Thus, by driving only one of the first gate driver 21 and the second gate driver 22, the power consumption in the multi-screen display device 202 can be reduced.

Third Embodiment

Figure 10:
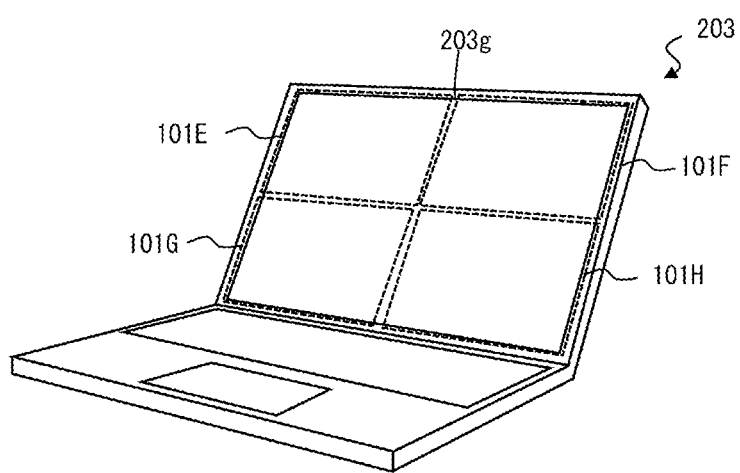
FIG. 10 is a schematic perspective view illustrating a multi-screen display device of a third embodiment.
Figure 11:
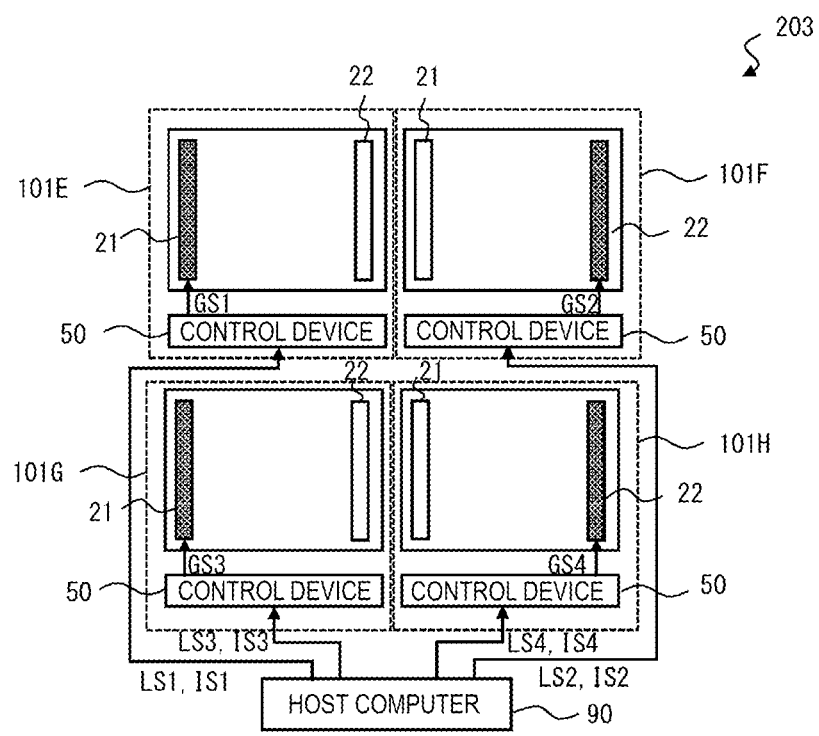
FIG. 11 is a schematic view illustrating a configuration of the multi-screen display device of the third embodiment.

A multi-screen display device of the present embodiment will be described. FIG. 10 is a schematic perspective view illustrating a multi-screen display device 203 of the present embodiment, and FIG. 11 is a schematic view illustrating a configuration of the multi-screen display device 203. The multi-screen display device 203 is a laptop computer.

The multi-screen display device 203 includes a first liquid crystal display module 101E, a second liquid crystal display module 101F, a third liquid crystal display module 101G, a fourth liquid crystal display module 101H, and the host computer 90.

The multi-screen display device 203 includes an integrated screen 203g, and the first liquid crystal display module 101E to the fourth liquid crystal display module 101H are arranged so that display screens of the first liquid crystal display module 101E to the fourth liquid crystal display module 101H are arranged in two rows and two columns on the screen 203g.

Each of the first liquid crystal display module 101E to the fourth liquid crystal display module 101H is the liquid crystal display module 101 described above.

As illustrated in FIG. 11, the first liquid crystal display module 101E to the fourth liquid crystal display module 101H are arranged such that the second gate driver 22 of the first liquid crystal display module 101E is adjacent to the first gate driver 21 of the second liquid crystal display module 101F, and the second gate driver 22 of the third liquid crystal display module 101G is adjacent to the first gate driver 21 of the fourth liquid crystal display module 101H. Further, the third liquid crystal display module 101G is adjacent to the first liquid crystal display module 101E in a direction orthogonal to the direction in which the gate bus lines extend, and the fourth liquid crystal display module 101H is adjacent to the second liquid crystal display module 101F in the direction orthogonal to the direction in which the gate bus lines extend.

For the first liquid crystal display module 101E and the third liquid crystal display module 101G, the host computer 90 drives the first gate driver 21 and pauses the second gate driver 22 to display images on the first liquid crystal display module 101E and the third liquid crystal display module 101G, respectively. Further, for the second liquid crystal display module 101F and the fourth liquid crystal display module 101H, the host computer 90 drives the second gate driver 22 and pauses the first gate driver 21 to display images on the second liquid crystal display module 101F and the fourth liquid crystal display module 101H, respectively.

More specifically, the host computer 90 generates the first image signal IS1 to a fourth image signal IS4 and the first arrangement information signal LS1 to a fourth arrangement information signal LS4. Then, the host computer 90 outputs the first image signal IS1 and the first arrangement information signal LS1 to the first liquid crystal display module 101E, outputs the second image signal IS2 and the second arrangement information signal LS2 to the second liquid crystal display module 101F, outputs the third image signal IS3 and the third arrangement information signal LS3 to the third liquid crystal display module 101G, and outputs the fourth image signal IS4 and the fourth arrangement information signal LS4 to the fourth liquid crystal display module 101H.

In the present embodiment, since the first liquid crystal display module 101E to the fourth liquid crystal display module 101H are arranged in two rows and two columns, as shown in Table 1, for example, the first arrangement information signal LS1 to the fourth arrangement information signal LS4 are "5" to "8". Further, the first image signal IS1 to the fourth image signal IS4 are image signals representing images positioned at the upper left, the upper right, the lower left, and the lower right of the screen 203g, respectively, and each of the images has a size that is ¼ of a size of the entire screen 203g.

The control device 50 of the first liquid crystal display module 101E receives the first image signal IS1 and the first arrangement information signal LS1 from the host computer 90, and generates the first gate signal GS1 from the first image signal IS1. Further, by generating the first gate circuit control signal CL1 based on the correspondence relationship in the table, the control device 50 outputs the first gate signal GS1 to the first gate driver 21.

Similarly, the control device 50 of the second liquid crystal display module 101F receives the second image signal IS2 and the second arrangement information signal LS2 from the host computer 90, and generates the second gate signal GS2 from the second image signal IS2. Further, by generating the second gate circuit control signal CL2 based on the correspondence relationship in the table, the control device 50 outputs the second gate signal GS2 to the second gate driver 22.

The control device 50 of the third liquid crystal display module 101G receives the third image signal IS3 and the third arrangement information signal LS3 from the host computer 90, and generates a third gate signal GS3 from the third image signal IS3. Further, by generating the first gate circuit control signal CL1 based on the correspondence relationship in the table, the control device 50 outputs the third gate signal GS3 to the first gate driver 21.

The control device 50 of the fourth liquid crystal display module 101H receives the fourth image signal IS4 and the fourth arrangement information signal LS4 from the host computer 90, and generates a fourth gate signal GS4 from the fourth image signal IS4. Further, by generating the second gate circuit control signal CL2 based on the correspondence relationship in the table, the control device 50 outputs the fourth gate signal GS4 to the second gate driver 22.

As described in the first embodiment, due to such control, display for which the influence of the flicker has been reduced can be performed in a central region of the screen 203g. In the central region, the first liquid crystal display module 101E and the second liquid crystal display module 101F are adjacent to each other, and the third liquid crystal display module 101G and the fourth liquid crystal display module 101H are adjacent to each other. However, since each of those liquid crystal display modules can display an image with good display quality in which the flicker is suppressed, the boundary between two of the liquid crystal display modules is unlikely to become noticeable. Further, in left end regions of the first liquid crystal display module 101E and the third liquid crystal display module 101G and right end regions of the second liquid crystal display module 101F and the fourth liquid crystal display module 101H, the influence from the flicker is more likely to manifest than in the central region since those regions are close to an operating gate driver. However, such a deterioration in the display quality is unlikely to become noticeable, since such regions are in the periphery of the screen 203g. Furthermore, since each of the first to fourth liquid crystal display modules 101E to 101H drives only one of the two gate drivers, the power consumption in the multi-screen display device 203 can be reduced.

The multi-screen display device 203 of the present embodiment can be suitably combined with a technique for adjusting the display quality of the screen by making the voltage applied to the common electrode different. For example, the multi-screen display device 203 of the present embodiment can be suitably combined with the technology disclosed in U.S. Ser. No. 10/564,916 (corresponding to JP 2019-70770 A). The disclosure of U.S. Ser. No. 10/564,916 is incorporated herein by reference.

Figure 12A:
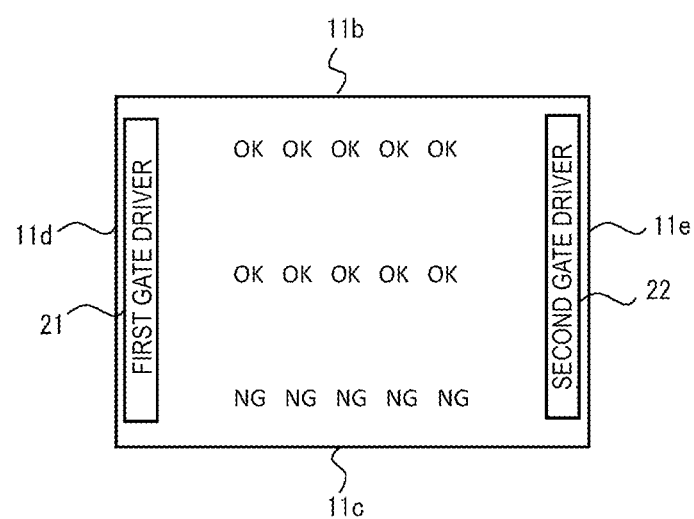
FIG. 12A is a schematic diagram illustrating a distribution example of variation in luminance in the liquid crystal display module.
Figure 12B:
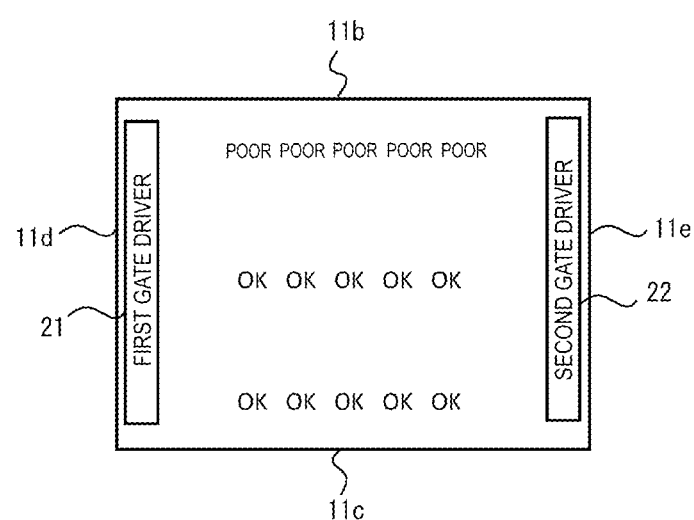
FIG. 12B is a schematic diagram illustrating a distribution example of the variation in luminance in the liquid crystal display module.

As disclosed in U.S. Ser. No. 10/564,916, a case is considered in which the region where the display quality deteriorates is shifted in the direction orthogonal to the direction in which the gate bus lines extend, depending on the value of the voltage applied to the common electrode of the liquid crystal display module. For example, the liquid crystal display module has characteristics in which, in a case where only one of the two gate drivers is driven, as shown in Table 2 and FIGS. 12A and 12B, when a voltage having a first set value is applied to the common electrode by shifting the voltage value from Vcom1, a region where the display quality is low, for example, where the variation in luminance is large appears in a lower portion of the liquid crystal display module, and when a voltage having a second set value is applied to the common electrode, the region where the variation in luminance is large appears in an upper portion of the liquid crystal display module.

TABLE 2

| Applied voltage | Position where display quality deteriorates |
|---|---|
| First set value (Vcom1d) | Lower portion (FIG. 12A) |
| Second set value (Vcom1u) | Upper portion (FIG. 12B) |

When the liquid crystal display module 101 has such characteristics, in the multi-screen display device 203 of the present embodiment, the value of the voltage applied to the common electrode can be made different from Vcom1 depending on the position of the liquid crystal display module 101 on the screen 203g of the multi-screen display device 203. For example, as shown in Table 3, the values of the voltage applied to the common electrodes 33 (FIG. 1) of the first liquid crystal display module 101E to the fourth liquid crystal display module 101H may be made different from each other. In the first liquid crystal display module 101E to the fourth liquid crystal display module 101H, the control device 50 may store a table indicating the correspondence relationship between the arrangement information signal and the voltage applied to the common electrode shown in Table 3, and may determine the voltage applied to the common electrode based on the first arrangement information signal LS1 to the fourth arrangement information signal LS4.

TABLE 3

| Number of screens | Screen arrangement | Arrangement position | Arrangement information signal | Voltage applied to common electrode |
|---|---|---|---|---|
| 4 | Two rows and two columns | Upper left | 5 | Second set value |
| | | Upper right | 6 | Second set value |
| | | Lower left | 7 | First set value |
| | | Lower right | 8 | First set value |

Specifically, in the first liquid crystal display module 101E, the control device 50 receives the first arrangement information signal LS1, determines the second set value as a first voltage to be applied to the common electrode 33, and applies the voltage having the second set value to the common electrode 33. Similarly, in the second liquid crystal display module 101F, the control device 50 receives the second arrangement information signal LS2, determines the second set value as a second voltage to be applied to the common electrode 33, and applies the voltage having the second set value to the common electrode 33. In the third liquid crystal display module 101G, the control device 50 receives the third arrangement information signal LS3, determines the first set value as a third voltage to be applied to the common electrode 33, and applies the voltage having the first set value to the common electrode 33. In the fourth liquid crystal display module 101H, the control device 50 receives the fourth arrangement information signal LS4, determines the first set value as a fourth voltage to be applied to the common electrode 33, and applies the voltage having the first set value to the common electrode 33.

As a result, display with a reduced variation in luminance can be performed in the central region of the screen 203g. In the central region, although the first liquid crystal display module 101E and the third liquid crystal display module 101G are adjacent to each other in the up-down direction, since both of the liquid crystal display modules can display an image with good display quality in which the variation in luminance is suppressed, the boundary between the two liquid crystal display modules is unlikely to become noticeable. The same applies to the boundary between the second liquid crystal display module 101F and the fourth liquid crystal display module 101H. Further, in upper end regions of the first liquid crystal display module 101E and the second liquid crystal display module 101F and lower end regions of the third liquid crystal display module 101G and the fourth liquid crystal display module 101H, the influence from the variation in luminance is more likely to manifest than in the central region. However, such a deterioration in the display quality is unlikely to become noticeable since such regions are in the periphery of the screen 203g. Thus, the multi-screen display device 203 can display an image with a higher display quality as a whole.

Fourth Embodiment

Figure 13:
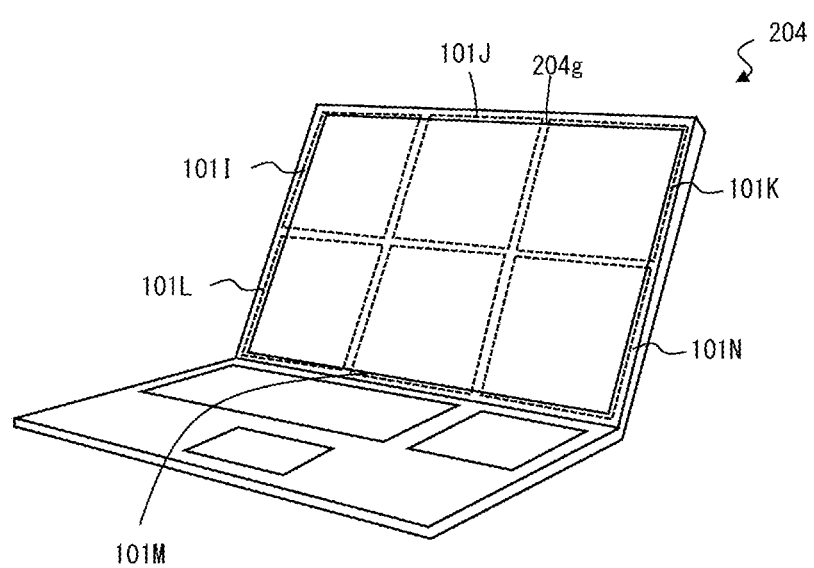
FIG. 13 is a schematic perspective view illustrating a multi-screen display device of a fourth embodiment.
Figure 14:
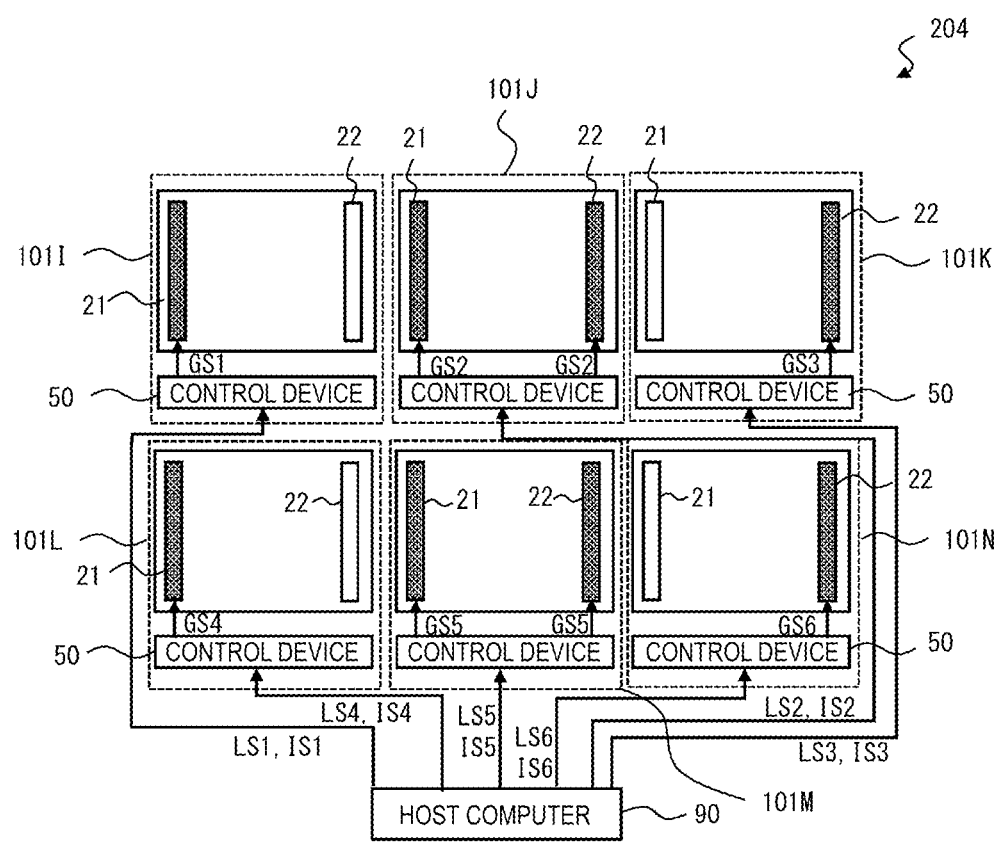
FIG. 14 is a schematic view illustrating a configuration of the multi-screen display device of the fourth embodiment.

A multi-screen display device of the present embodiment will be described. FIG. 13 is a schematic perspective view illustrating a multi-screen display device 204 of the present embodiment, and FIG. 14 is a schematic view illustrating a configuration of the multi-screen display device 204. The multi-screen display device 204 is a laptop computer.

The multi-screen display device 204 includes a first liquid crystal display module 101I, a second liquid crystal display module 101J, a third liquid crystal display module 101K, a fourth liquid crystal display module 101L, a fifth liquid crystal display module 101M, a sixth liquid crystal display module 101N, and the host computer 90.

The multi-screen display device 204 includes an integrated screen 204g, and the first liquid crystal display module 101I to the sixth liquid crystal display module 101N are arranged so that display screens of the first liquid crystal display module 101I to the sixth liquid crystal display module 101N are arranged in two rows and three columns on the screen 204g. Each of the first liquid crystal display module 101I to the sixth liquid crystal display module 101N is the liquid crystal display module 101 described above.

As illustrated in FIG. 13, in the multi-screen display device 204, the first liquid crystal display module 101I, the second liquid crystal display module 101J, and the third liquid crystal display module 101K are arrayed in the direction in which the plurality of gate bus lines extend, and are arranged such that the second gate driver 22 of the first liquid crystal display module 101I is adjacent to the first gate driver 21 of the second liquid crystal display module 101J, and the second gate driver 22 of the second liquid crystal display module 101J is adjacent to the first gate driver 21 of the third liquid crystal display module 101K.

Similarly, the fourth liquid crystal display module 101L, the fifth liquid crystal display module 101M, and the sixth liquid crystal display module 101N are arrayed in the direction in which the plurality of gate bus lines extend, and are arranged such that the second gate driver 22 of the fourth liquid crystal display module 101L is adjacent to the first gate driver 21 of the fifth liquid crystal display module 101M, and the second gate driver 22 of the fifth liquid crystal display module 101M is adjacent to the first gate driver 21 of the sixth liquid crystal display module 101N.

Further, the fourth liquid crystal display module 101L to the sixth liquid crystal display module 101N are arranged so as to be adjacent to the first liquid crystal display module 101I to the third liquid crystal display module 101K, respectively.

The host computer 90 drives the first gate driver 21 and pauses the second gate driver 22 to display an image on the first liquid crystal display module 101I, drives the first gate driver 21 and the second gate driver 22 to display an image on the second liquid crystal display module 101J, and drives the second gate driver 22 and pauses the first gate driver 21 to display an image on the third liquid crystal display module 101K.

Similarly, the host computer 90 drives the first gate driver 21 and pauses the second gate driver 22 to display an image on the fourth liquid crystal display module 101L, drives the first gate driver 21 and the second gate driver 22 to display an image on the fifth liquid crystal display module 101M, and drives the second gate driver 22 and pauses the first gate driver 21 to display an image on the sixth liquid crystal display module 101N.

More specifically, the host computer 90 generates the first image signal IS1 to a sixth image signal IS6 and the first arrangement information signal LS1 to a sixth arrangement information signal LS6. Then, the host computer 90 outputs the first image signal IS1 and the first arrangement information signal LS1 to the first liquid crystal display module 101I, outputs the second image signal IS2 and the second arrangement information signal LS2 to the second liquid crystal display module 101J, outputs the third image signal IS3 and the third arrangement information signal LS3 to the third liquid crystal display module 101K, outputs the fourth image signal IS4 and the fourth arrangement information signal LS4 to the fourth liquid crystal display module 101L, outputs the fifth image signal IS5 and the fifth arrangement information signal LS5 to the fifth liquid crystal display module 101M, and outputs the sixth image signal IS6 and the sixth arrangement information signal LS6 to the sixth liquid crystal display module 101N.

In the present embodiment, since the first to sixth liquid crystal display modules 101I to 101N are arranged in two rows and three columns, as shown in Table 1, for example, the first to sixth arrangement information signals LS1 to LS6 are "9" to "14". Further, the first image signal IS1 to the sixth image signal IS6 are image signals representing images positioned at the upper left, the upper middle, the upper right, the lower left, the lower middle, and the lower right of the screen 204g, respectively, and each of the images has a size that is ⅙ of a size of the entire screen 204g.

The control device 50 of the first liquid crystal display module 101I receives the first image signal IS1 and the first arrangement information signal LS1 from the host computer 90, and generates the first gate signal GS1 from the first image signal IS1. Further, by generating the first gate circuit control signal CL1 based on the correspondence relationship in the table, the control device 50 outputs the first gate signal GS1 to the first gate driver 21.

Similarly, the control device 50 of the second liquid crystal display module 101J receives the second image signal IS2 and the second arrangement information signal LS2 from the host computer 90, and generates the second gate signal GS2 from the second image signal IS2. Further, by generating the first gate circuit control signal CL1 and the second gate circuit control signal CL2 based on the correspondence relationship in the table, the control device 50 outputs the second gate signal GS2 to the first gate driver 21 and the second gate driver 22.

The control device 50 of the third liquid crystal display module 101K receives the third image signal IS3 and the third arrangement information signal LS3 from the host computer 90, and generates the third gate signal GS3 from the third image signal IS3. Further, by generating the second gate circuit control signal CL2 based on the correspondence relationship in the table, the control device 50 outputs the third gate signal GS3 to the second gate driver 22.

The control device 50 of the fourth liquid crystal display module 101L receives the fourth image signal IS4 and the fourth arrangement information signal LS4 from the host computer 90, and generates the fourth gate signal GS4 from the fourth image signal IS4. Further, by generating the first gate circuit control signal CL1 based on the correspondence relationship in the table, the control device 50 outputs the fourth gate signal GS4 to the first gate driver 21.

The control device 50 of the fifth liquid crystal display module 101M receives the fifth image signal IS5 and the fifth arrangement information signal LS5 from the host computer 90, and generates a fifth gate signal GS5 from the fifth image signal IS5. Further, by generating the first gate circuit control signal CL1 and the second gate circuit control signal CL2 based on the correspondence relationship in the table, the control device 50 outputs the fifth gate signal GS5 to the first gate driver 21 and the second gate driver 22.

The control device 50 of the sixth liquid crystal display module 101N receives the sixth image signal IS6 and the sixth arrangement information signal LS6 from the host computer 90, and generates a sixth gate signal GS6 from the sixth image signal IS6. Further, by generating the second gate circuit control signal CL2 based on the correspondence relationship in the table, the control device 50 outputs the sixth gate signal GS6 to the second gate driver 22.

According to the multi-screen display device 204 of the present embodiment, in the second liquid crystal display module 101J and the fifth liquid crystal display module 101M arranged at the center of the screen 204g, the first gate driver 21 and the second gate driver 22 are driven to input the gate signals from both ends of the gate bus lines. Thus, display for which the influence of the flicker has been reduced can be performed in a wide central region of the screen 204g, which includes display regions of the second liquid crystal display module 101J and the fifth liquid crystal display module 101M. Further, since the number of liquid crystal display modules in which both the first gate driver 21 and the second gate driver 22 are driven is one third of the total number, the power consumption can be reduced compared to a case where both the gate drivers are driven in all of the liquid crystal display modules.

Note that, although the multi-screen display device 204 includes the six liquid crystal display modules arranged in two rows and three columns in the present embodiment, the same effect can be obtained even when the multi-screen display device includes three of the liquid crystal display modules arranged in one row and three columns.

Fifth Embodiment

Figure 15A:
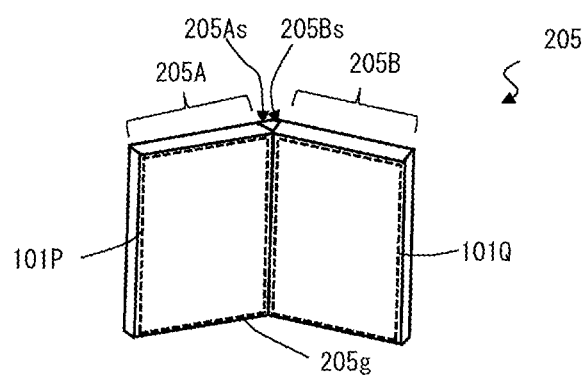
FIG. 15A is a schematic perspective view illustrating a multi-screen display device of a fifth embodiment.
Figure 15B:
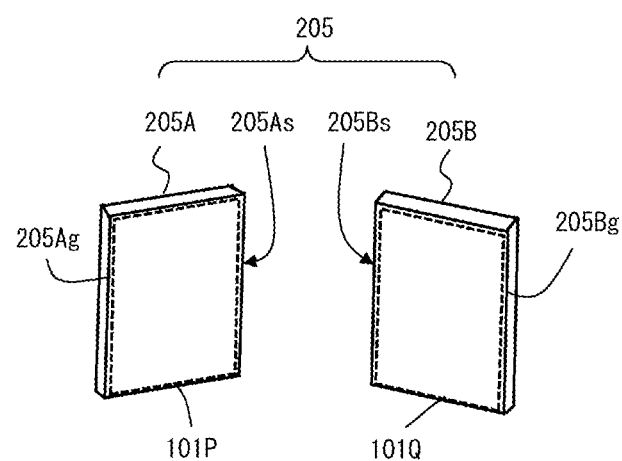
FIG. 15B is a schematic perspective view illustrating the multi-screen display device of the fifth embodiment.
Figure 16A:
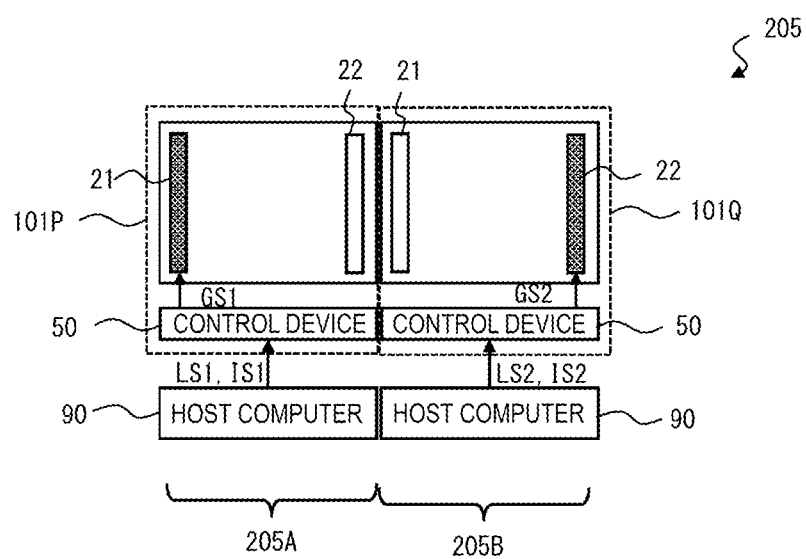
FIG. 16A is a schematic view illustrating a configuration of the multi-screen display device of the fifth embodiment.
Figure 16B:
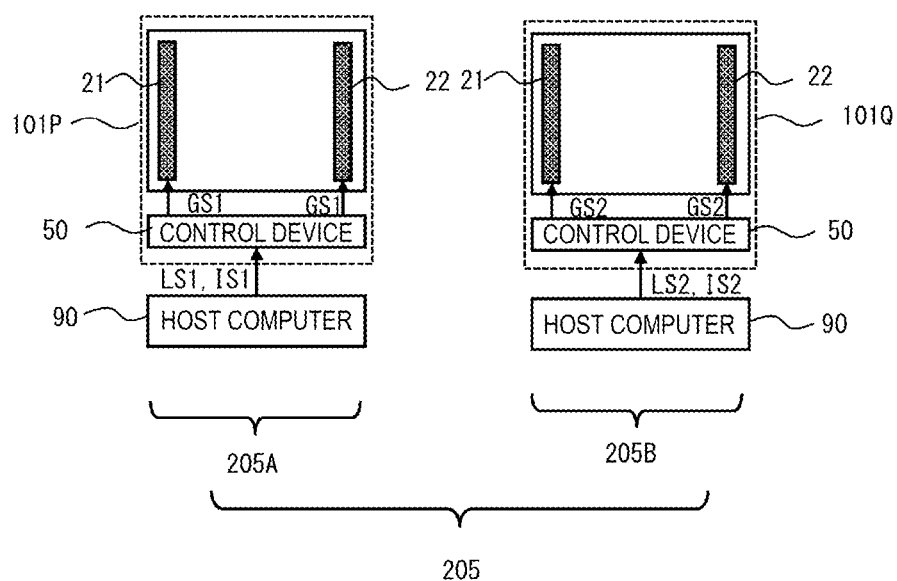
FIG. 16B is a schematic view illustrating the configuration of the multi-screen display device of the fifth embodiment.

A multi-screen display device of the present embodiment will be described. FIGS. 15A and 15B are schematic perspective views each illustrating a multi-screen display device 205 of the present embodiment, and FIGS. 16A and 16B are schematic views each illustrating a configuration of the multi-screen display device 205. The multi-screen display device 205 is, for example, an electronic book.

The multi-screen display device 205 includes a first portion 205A and a second portion 205B. The first portion 205A and the second portion 205B are provided with independent housings, respectively, and a first liquid crystal display module 101P and the host computer 90 are disposed inside the first portion 205A. Further, a second liquid crystal display module 101Q and the host computer 90 are disposed inside the second portion 205B.

The first portion 205A includes a screen 205Ag, and a display portion of the first liquid crystal display module 101P is disposed in the screen 205Ag. Similarly, the second portion 205B includes a screen 205Bg, and a display portion of the second liquid crystal display module 101Q is disposed in the screen 205Bg.

The first portion 205A and the second portion 205B are configured to be detachable and attachable. As illustrated in FIGS. 15A and 16A, each of the first portion 205A and the second portion 205B has, for example, a plate shape, and engaging portions each having a rotation shaft are disposed at a side surface 205As of the first portion 205A and a side surface 205Bs of the second portion 205B, respectively.

In a state where the first portion 205A and the second portion 205B are attached to each other, the multi-screen display device 205 can be folded such that the first liquid crystal display module 101P of the first portion 205A and the second liquid crystal display module 101Q of the second portion 205B face each other. Further, when the multi-screen display device 205 is opened, the screen 205Ag and the screen 205Bg constitute one screen 205g.

In the state where the first portion 205A and the second portion 205B are attached to each other, the multi-screen display device 205 operates in the same manner as the multi-screen display device 201 described above in the first embodiment, and exerts the same effect.

The multi-screen display device 205 includes a detector that detects attachment/detachment of the first portion 205A and the second portion 205B, at at least one of the side surface 205As of the first portion 205A and the side surface 205Bs of the second portion 205B. The detector may be a microswitch or the like. In the multi-screen display device 205, when the detector detects that the first portion 205A and the second portion 205B are separated from each other, the host computer 90 drives the first gate driver 21 and the second gate driver 22 in the first portion 205A to display an image on the first liquid crystal display module 101P. Similarly, in the second portion 205B, the host computer 90 drives the first gate driver 21 and the second gate driver 22 to display an image on the second liquid crystal display module 101Q. As a result, when the first portion 205A and the second portion 205B are independently used, an occurrence of the flicker is suppressed in the entire region of each of the screen 205Ag and the screen 205Bg.

Other Embodiments

The liquid crystal display module and the multi-screen display device of the disclosure are not limited to the above-described embodiments, and various modifications may be made to the liquid crystal display modules and the multi-screen display devices of the above-described embodiments. Firstly, the above-described embodiments can be combined with each other in an appropriate manner and implemented.

Further, the driving method or the configuration of the liquid crystal display module is not limited, and liquid crystal display panels of various driving methods can be used. Further, the arrangement information signal is not limited to the example shown in Table 1. As described above in the embodiments, the positions of the plurality of liquid crystal display modules arranged in the direction in which the gate bus lines extend, on the screen of the multi-screen display device are one important piece of information in the arrangement information signal. For example, the arrangement information signal may be information indicating three pieces of information, namely, information indicating the right end, the left end, and a position other than the right end and the left end with respect to the plurality of liquid crystal display modules arranged in the direction in which the gate bus line extends. Further, the arrangement information signal may indicate information for generating one or both of the first gate circuit control signal and the second gate circuit control signal.

Further, as described above with reference to FIG. 5C, in the liquid crystal display module of the disclosure, when both the first gate driver 21 and the second gate driver 22 are driven, it is possible to suppress the deterioration in the display quality due to the flicker over substantially the entire display region. Thus, in the multi-screen display device of the disclosure, priority may be given to the uniformity of the display quality of the entire screen, and both the first gate driver 21 and the second gate driver 22 of all of the plurality of liquid crystal display modules may be driven. For example, in the multi-screen display device 204 of the fourth embodiment, both the first gate driver 21 and the second gate driver 22 of the first liquid crystal display module 101I, the third liquid crystal display module 101K, the fourth liquid crystal display module 101L, and the sixth liquid crystal display module 101N may be driven. However, since such driving increases the power consumption, it is preferable that a period during which both the gate drivers of all the liquid crystal display modules are driven be short.

Further, in the present embodiment, the flicker, which is caused by the field-through voltage, is mainly considered as a cause of the deterioration in the display quality. However, depending on the structure, the driving method, or the usage conditions of the liquid crystal display module, such flicker may not be so problematic, and a delay in the gate output signal due to the parasitic capacitance of the pixel may be considered as the main cause of the deterioration in the display quality. On the gate bus line, the greater the distance from an input position of the gate output signal, the greater the deterioration in the display quality due to the delay in the gate output signal. Thus, the display quality deteriorates at the pixel located at the position farthest from the gate driver to be driven.

Therefore, when a liquid crystal display module, in which the delay in the gate output signal is the main cause of the deterioration in the display quality, is provided, the gate driver to be selected may be reversed in the above-described embodiments. For example, in the case of the multi-screen display device according to the first embodiment, the first gate driver 21 may be paused and the second gate driver 22 may be driven in the first liquid crystal display module 101A, and the first gate driver 21 may be driven and the second gate driver 22 may be paused in the second liquid crystal display module 101B. Further, when the liquid crystal display modules are arranged in one row and three columns, the first gate driver 21 and the second gate driver 22 may be driven in the liquid crystal display module located at the center. Further, in order to obtain such a correspondence relationship as described above, a table in which the arrangement information signal is associated with the gate driver to be driven may be stored in the timing controller.

As described above, in the multi-screen display device according to the disclosure, regardless of whether the field-through voltage is the main cause of the deterioration in the display quality, or the delay in the gate signal is the main cause of the deterioration in the display quality, the first gate driver 21 and the second gate driver 22 adjacent to each other in a pair of the liquid crystal display modules adjacent to each other in the direction in which the gate bus lines extend are either both driven or both paused.

The liquid crystal display module for the multi-screen display device and the multi-screen display device according to the disclosure can also be described as follows.

A liquid crystal display module for a multi-screen display device according to a first configuration includes a liquid crystal display panel including a plurality of gate bus lines, a first gate driver connected to first ends of the plurality of gate bus lines, and a second gate driver connected to second ends of the plurality of gate bus lines, and a control device. The control device receives, from a host computer, an image signal, and an arrangement information signal indicating arrangement information of the liquid crystal display panel in the multi-screen display device, generates a gate signal from the image signal, and outputs the gate signal to one or both of the first gate driver and the second gate driver determined based on the arrangement information signal.

According to the first configuration, by driving one or both of the first gate driver and the second gate driver based on the arrangement information signal, it is possible to control the position of a region where deterioration of the display quality occurs. Thus, when a multi-screen display device is configured, the display quality of a central region of a screen can be improved.

With respect to the first configuration, in a liquid crystal display module for a multi-screen display device according to a second configuration, the control device may include a timing controller, a first gate circuit, and a second gate circuit. The timing controller may generate the gate signal from the image signal, and may generate a first gate circuit control signal and a second gate circuit control signal from the arrangement information signal. The first gate circuit may selectively output the gate signal to the first gate driver based on the first gate circuit control signal, and the second gate circuit may selectively output the gate signal to the second gate driver based on the second gate circuit control signal.

With respect to the first configuration, in a liquid crystal display module for a multi-screen display device according to a third configuration, the liquid crystal display panel may further include a common electrode, and the control device may apply, to the common electrode, a voltage having a value based on the arrangement information signal.

A multi-screen display device according to a fourth configuration includes a first liquid crystal display module, a second liquid crystal display module, and a host computer. Each of the first liquid crystal display module and the second liquid crystal display module includes a liquid crystal display panel including a plurality of gate bus lines, a first gate driver connected to first ends of the plurality of gate bus lines, and a second gate driver connected to second ends of the plurality of gate bus lines. The first liquid crystal display module and the second liquid crystal display module are arranged side by side to cause the second gate driver of the first liquid crystal display module to be adjacent to the first gate driver of the second liquid crystal display module, and the host computer drives the first gate driver and pauses the second gate driver of the first liquid crystal display module to display an image on the first liquid crystal display module, and drives the second gate driver and pauses the first gate driver of the second liquid crystal display module to display an image on the second liquid crystal display module.

According to the fourth configuration, deterioration in the display quality due to flicker in the central region of the screen is suppressed, and an image can be displayed with an excellent display quality as a whole.

With respect to the fourth configuration, in a multi-screen display device according to a fifth configuration, each of the first liquid crystal display module and the second liquid crystal display module may further include a control device. The host computer may generate a first image signal, a second image signal, a first arrangement information signal indicating arrangement information of the first liquid crystal display module in the multi-screen display device, and a second arrangement information signal indicating arrangement information of the second liquid crystal display module in the multi-screen display device. In the first liquid crystal display module, the control device may receive the first image signal and the first arrangement information signal from the host computer, may generate a first gate signal from the first image signal, and may output the first gate signal to the first gate driver based on the first arrangement information signal. In the second liquid crystal display module, the control device may receive the second image signal and the second arrangement information signal from the host computer, may generates a second gate signal from the second image signal, and may output the second gate signal to the second gate driver based on the second arrangement information signal.

With respect to the fourth configuration, in a multi-screen display device according to a sixth configuration, the first liquid crystal display module and the second liquid crystal display module may be held to be separable from each other, and in a state where the first liquid crystal display module and the second liquid crystal display module are separated from each other, the host computer may drive the first gate drivers and the second gate drivers to display an image on each of the first liquid crystal display module and the second liquid crystal display module.

With respect to the fourth configuration, in a multi-screen display device according to a seventh configuration, the first liquid crystal display module and the second liquid crystal display module may be held to be foldable to face each other.

With respect to the fourth configuration, a multi-screen display device according to an eighth configuration may further include a third liquid crystal display module and a fourth liquid crystal display module each including a plurality of gate bus lines, and a first gate driver connected to first ends of the plurality of gate bus lines, and a second gate driver connected to second ends of the plurality of gate bus lines. The third liquid crystal display module and the fourth liquid crystal display module may be arranged side by side to cause the second gate driver of the third liquid crystal display module to be adjacent to the first gate driver of the fourth liquid crystal display module, to cause the third liquid crystal display module to be adjacent to the first liquid crystal display module, and to cause the fourth liquid crystal display module to be adjacent to the second liquid crystal display module. The host computer may drive the first gate driver and pauses the second gate driver of the third liquid crystal display module to display an image on the third liquid crystal display module, and may drive the second gate driver and pauses the first gate driver of the fourth liquid crystal display module to display an image on the fourth liquid crystal display module.

With respect to the eighth configuration, in a multi-screen display device according a ninth configuration, each of the first liquid crystal display module, the second liquid crystal display module, the third liquid crystal display module, and the fourth liquid crystal display module may further include a control device. The host computer may generate a first image signal, a second image signal, a third image signal, and a fourth image signal, and a first arrangement information signal, a second arrangement information signal, a third arrangement information signal, and a fourth arrangement information signal indicating arrangement information of the first liquid crystal display module, the second liquid crystal display module, the third liquid crystal display module, and the fourth liquid crystal display module in the multi-screen display device, respectively. In the first liquid crystal display module, the control device may receive the first image signal and the first arrangement information signal from the host computer, may generate a first gate signal from the first image signal, and may output the first gate signal to the first gate driver based on the first arrangement information signal. In the second liquid crystal display module, the control device may receive the second image signal and the second arrangement information signal from the host computer, may generate a second gate signal from the second image signal, and may output the second gate signal to the second gate driver based on the second arrangement information signal. In the third liquid crystal display module, the control device may receive the third image signal and the third arrangement information signal from the host computer, may generate a third gate signal from the third image signal, and may output the third gate signal to the first gate driver based on the third arrangement information signal. In the fourth liquid crystal display module, the control device may receive the fourth image signal and the fourth arrangement information signal from the host computer, may generate a fourth gate signal from the fourth image signal, and may output the fourth gate signal to the second gate driver based on the fourth arrangement information signal.

With respect to the ninth configuration, in a multi-screen display device according to a tenth configuration, the liquid crystal display panel of each of the first liquid crystal display module, the second liquid crystal display module, the third liquid crystal display module, and the fourth liquid crystal display module may further include a common electrode. In the first liquid crystal display module, the control device may apply, to the common electrode, a first voltage having a value based on the first arrangement information signal, in the second liquid crystal display module, the control device may apply, to the common electrode, a second voltage having a value based on the second arrangement information signal, in the third liquid crystal display module, the control device may apply, to the common electrode, a third voltage having a value based on the third arrangement information signal, and in the fourth liquid crystal display module, the control device may apply, to the common electrode, a fourth voltage having a value based on the fourth arrangement information signal.

A multi-screen display device according to an eleventh configuration includes a first liquid crystal display module, a second liquid crystal display module, and a host computer. Each of the first liquid crystal display module and the second liquid crystal display module includes a liquid crystal display panel including a plurality of gate bus lines, a first gate driver connected to first ends of the plurality of gate bus lines, and a second gate driver connected to second ends of the plurality of gate bus lines. The first liquid crystal display module and the second liquid crystal display module are arranged to cause the first gate driver of the first liquid crystal display module and the first gate driver of the second liquid crystal display module to be arranged side by side in a direction orthogonal to a direction in which the plurality of gate bus lines extend. The host computer drives the first gate driver and the second gate driver of the first liquid crystal display module to display an image on the first liquid crystal display module, and drives one of the first gate driver and the second gate driver and pauses the other of the first gate driver and the second gate driver of the second liquid crystal display module to display an image on the second liquid crystal display module.

According to the eleventh configuration, in the first liquid crystal display module, an image can be displayed with a high display quality by driving both of the gate drivers. Further, in the second liquid crystal display module, power consumption can be suppressed by driving only one of the gate drivers.

With respect to the eleventh configuration, in a multi-screen display device according to a twelfth configuration, each of the first liquid crystal display module and the second liquid crystal display module may further include a control device. The host computer may generate a first image signal, a second image signal, a first arrangement information signal indicating arrangement information of the first liquid crystal display module in the multi-screen display device, and a second arrangement information signal indicating arrangement information of the second liquid crystal display module in the multi-screen display device. In the first liquid crystal display module, the control device may receive the first image signal and the first arrangement information signal from the host computer, may generate a first gate signal from the first image signal, and may output the first gate signal to the first gate driver and the second gate driver based on the first arrangement information signal. In the second liquid crystal display module, the control device may receive the second image signal and the second arrangement information signal from the host computer, may generate a second gate signal from the second image signal, and may output the second gate signal to only one of the first gate driver and the second gate driver based on the second arrangement information signal.

A multi-screen display device according to a thirteenth configuration includes a first liquid crystal display module, a second liquid crystal display module, a third liquid crystal display module, and a host computer. Each of the first liquid crystal display module, the second liquid crystal display module, and the third liquid crystal display module includes a liquid crystal display panel including a plurality of gate bus lines, a first gate driver connected to first ends of the plurality of gate bus lines, and a second gate driver connected to second ends of the plurality of gate bus lines. The first liquid crystal display module, the second liquid crystal display module, and the third liquid crystal display module are arrayed in a direction in which the plurality of gate bus lines extend, and are arranged side by side to cause the second gate driver of the first liquid crystal display module to be adjacent to the first gate driver of the second liquid crystal display module, and to cause the second gate driver of the second liquid crystal display module to be adjacent to the first gate driver of the third liquid crystal display module. The host computer drives the first gate driver and pauses the second gate driver of the first liquid crystal display module to display an image on the first liquid crystal display module, drives the first gate driver and the second gate driver of the second liquid crystal display module to display an image on the second liquid crystal display module, and drives the second gate driver and pauses the first gate driver of the third liquid crystal display module to display an image on the third liquid crystal display module.

According to the thirteenth configuration, deterioration in the display quality due to flicker in the central region of the screen is suppressed, and an image can be displayed with an excellent display quality as a whole.

With respect to the thirteenth configuration, in a multi-screen display device according to a fourteenth configuration, each of the first liquid crystal display module, the second liquid crystal display module, and the third liquid crystal display module may further include a control device, the host computer may generate a first image signal, a second image signal, and a third image signal, and a first arrangement information signal, a second arrangement information signal, and a third arrangement information signal indicating arrangement information of the first liquid crystal display module, the second liquid crystal display module, and the third liquid crystal display module in the multi-screen display device, respectively. In the first liquid crystal display module, the control device may receive the first image signal and the first arrangement information signal from the host computer, may generate a first gate signal from the first image signal, and may output the first gate signal to the first gate driver based on the first arrangement information signal. In the second liquid crystal display module, the control device may receive the second image signal and the second arrangement information signal from the host computer, may generate a second gate signal from the second image signal, and may output the second gate signal to the first gate driver and the second gate driver based on the second arrangement information signal. In the third liquid crystal display module, the control device may receive the third image signal and the third arrangement information signal from the host computer, may generate a third gate signal from the third image signal, and may output the third gate signal to the second gate driver based on the third arrangement information signal.

With respect to the thirteenth configuration, a multi-screen display device according to a fifteenth configuration may further include a fourth liquid crystal display module, a fifth liquid crystal display module, and a sixth liquid crystal display module each including a plurality of gate bus lines, and a first gate driver connected to first ends of the plurality of gate bus lines, and a second gate driver connected to second ends of the plurality of gate bus lines. The fourth liquid crystal display module, the fifth liquid crystal display module, and the sixth liquid crystal display module may be arrayed in a direction in which the plurality of gate bus lines extend, and may be arranged side by side to cause the second gate driver of the fourth liquid crystal display module to be adjacent to the first gate driver of the fifth liquid crystal display module, to cause the second gate driver of the fifth liquid crystal display module to be adjacent to the first gate driver of the sixth liquid crystal display module, and to cause the fourth liquid crystal display module, the fifth liquid crystal display module, and the sixth liquid crystal display module to be adjacent to the first liquid crystal display module, the second liquid crystal display module, and the third liquid crystal display module, respectively. The host computer may drive the first gate driver and pauses the second gate driver of the fourth liquid crystal display module to display an image on the fourth liquid crystal display module, may drive the first gate driver and the second gate driver of the fifth liquid crystal display module to display an image on the fifth liquid crystal display module, and may drive the second gate driver and pauses the first gate driver of the sixth liquid crystal display module to display an image on the sixth liquid crystal display module.

With respect to the fifteenth configuration, in a multi-screen display device according to a sixteenth configuration, each of the first liquid crystal display module, the second liquid crystal display module, the third liquid crystal display module, the fourth liquid crystal display module, the fifth liquid crystal display module, and the sixth liquid crystal display module may further include a control device. The host computer may generate a first image signal, a second image signal, a third image signal, a fourth image signal, a fifth image signal, and a sixth image signal, and a first arrangement information signal, a second arrangement information signal, a third arrangement information signal, a fourth arrangement information signal, a fifth arrangement information signal, and a sixth arrangement information signal indicating arrangement information of the first liquid crystal display module, the second liquid crystal display module, the third liquid crystal display module, the fourth liquid crystal display module, the fifth liquid crystal display module, and the sixth liquid crystal display module in the multi-screen display device, respectively. In the first liquid crystal display module, the control device may receive the first image signal and the first arrangement information signal from the host computer, may generate a first gate signal from the first image signal, and may output the first gate signal to the first gate driver based on the first arrangement information signal. In the second liquid crystal display module, the control device may receive the second image signal and the second arrangement information signal from the host computer, may generate a second gate signal from the second image signal, and may output the second gate signal to the first gate driver and the second gate driver based on the second arrangement information signal. In the third liquid crystal display module, the control device may receive the third image signal and the third arrangement information signal from the host computer, may generate a third gate signal from the third image signal, and may output the third gate signal to the second gate driver based on the third arrangement information signal. In the fourth liquid crystal display module, the control device may receive the fourth image signal and the fourth arrangement information signal from the host computer, may generate a fourth gate signal from the fourth image signal, and may output the fourth gate signal to the first gate driver based on the fourth arrangement information signal. In the fifth liquid crystal display module, the control device may receive the fifth image signal and the fifth arrangement information signal from the host computer, may generate a fifth gate signal from the fifth image signal, and may output the fifth gate signal to the first gate driver and the second gate driver based on the fifth arrangement information signal. In the sixth liquid crystal display module, the control device may receive the sixth image signal and the sixth arrangement information signal from the host computer, may generate a sixth gate signal from the sixth image signal, and may output the sixth gate signal to the second gate driver based on the sixth arrangement information signal.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A liquid crystal display module for a multi-screen display device, the liquid crystal display module comprising:
   a liquid crystal display panel including
   a plurality of gate bus lines,
   a first gate driver connected to first ends of the plurality of gate bus lines, and
   a second gate driver connected to second ends of the plurality of gate bus lines; and
   a control device,
   wherein the control device receives, from a host computer, an image signal, and an arrangement information signal indicating arrangement information of the liquid crystal display panel in the multi-screen display device, generates a gate signal from the image signal, and outputs the gate signal to one or both of the first gate driver and the second gate driver determined based on the arrangement information signal.

2. The liquid crystal display module for the multi-screen display device according to claim 1, wherein the control device includes a timing controller, a first gate circuit, and a second gate circuit, the timing controller generates the gate signal from the image signal, and generates a first gate circuit control signal and a second gate circuit control signal from the arrangement information signal, the first gate circuit selectively outputs the gate signal to the first gate driver based on the first gate circuit control signal, and the second gate circuit selectively outputs the gate signal to the second gate driver based on the second gate circuit control signal.

3. The liquid crystal display module for the multi-screen display device according to claim 1, wherein the liquid crystal display panel further includes a common electrode, and the control device applies, to the common electrode, a voltage having a value based on the arrangement information signal.

4. A multi-screen display device comprising:

a first liquid crystal display module;

a second liquid crystal display module; and a host computer, wherein each of the first liquid crystal display module and the second liquid crystal display module includes a liquid crystal display panel including a plurality of gate bus lines, a first gate driver connected to first ends of the plurality of gate bus lines, and a second gate driver connected to second ends of the plurality of gate bus lines, the first liquid crystal display module and the second liquid crystal display module are arranged side by side to cause the second gate driver of the first liquid crystal display module to be adjacent to the first gate driver of the second liquid crystal display module, and the host computer drives the first gate driver and pauses the second gate driver of the first liquid crystal display module to display an image on the first liquid crystal display module, and drives the second gate driver and pauses the first gate driver of the second liquid crystal display module to display an image on the second liquid crystal display module.

5. The multi-screen display device according to claim 4, wherein each of the first liquid crystal display module and the second liquid crystal display module further includes a control device, the host computer generates a first image signal, a second image signal, a first arrangement information signal indicating arrangement information of the first liquid crystal display module in the multi-screen display device, and a second arrangement information signal indicating arrangement information of the second liquid crystal display module in the multi-screen display device, in the first liquid crystal display module, the control device receives the first image signal and the first arrangement information signal from the host computer, generates a first gate signal from the first image signal, and outputs the first gate signal to the first gate driver based on the first arrangement information signal, and in the second liquid crystal display module, the control device receives the second image signal and the second arrangement information signal from the host computer, generates a second gate signal from the second image signal, and outputs the second gate signal to the second gate driver based on the second arrangement information signal.

6. The multi-screen display device according to claim 4, wherein the first liquid crystal display module and the second liquid crystal display module are held to be separable from each other, and in a state where the first liquid crystal display module and the second liquid crystal display module are separated from each other, the host computer drives the first gate drivers and the second gate drivers to display an image on each of the first liquid crystal display module and the second liquid crystal display module.

7. The multi-screen display device according to claim 4, wherein the first liquid crystal display module and the second liquid crystal display module are held to be foldable to face each other.

8. The multi-screen display device according to claim 4, further comprising:

a third liquid crystal display module and a fourth liquid crystal display module each including a plurality of gate bus lines, and a first gate driver connected to first ends of the plurality of gate bus lines, and a second gate driver connected to second ends of the plurality of gate bus lines, wherein the third liquid crystal display module and the fourth liquid crystal display module are arranged side by side to cause the second gate driver of the third liquid crystal display module to be adjacent to the first gate driver of the fourth liquid crystal display module, to cause the third liquid crystal display module to be adjacent to the first liquid crystal display module, and to cause the fourth liquid crystal display module to be adjacent to the second liquid crystal display module, and the host computer drives the first gate driver and pauses the second gate driver of the third liquid crystal display module to display an image on the third liquid crystal display module, and drives the second gate driver and pauses the first gate driver of the fourth liquid crystal display module to display an image on the fourth liquid crystal display module.

9. The multi-screen display device according to claim 8, wherein each of the first liquid crystal display module, the second liquid crystal display module, the third liquid crystal display module, and the fourth liquid crystal display module further includes a control device, the host computer generates a first image signal, a second image signal, a third image signal, and a fourth image signal, and a first arrangement information signal, a second arrangement information signal, a third arrangement information signal, and a fourth arrangement information signal indicating arrangement information of the first liquid crystal display module, the second liquid crystal display module, the third liquid crystal display module, and the fourth liquid crystal display module in the multi-screen display device, respectively, in the first liquid crystal display module, the control device receives the first image signal and the first arrangement information signal from the host computer, generates a first gate signal from the first image signal, and outputs the first gate signal to the first gate driver based on the first arrangement information signal, in the second liquid crystal display module, the control device receives the second image signal and the second arrangement information signal from the host computer, generates a second gate signal from the second image signal, and outputs the second gate signal to the second gate driver based on the second arrangement information signal, in the third liquid crystal display module, the control device receives the third image signal and the third arrangement information signal from the host computer, generates a third gate signal from the third image signal, and outputs the third gate signal to the first gate driver based on the third arrangement information signal, and in the fourth liquid crystal display module, the control device receives the fourth image signal and the fourth arrangement information signal from the host computer, generates a fourth gate signal from the fourth image signal, and outputs the fourth gate signal to the second gate driver based on the fourth arrangement information signal.

10. The multi-screen display device according to claim 9, wherein the liquid crystal display panel of each of the first liquid crystal display module, the second liquid crystal display module, the third liquid crystal display module, and the fourth liquid crystal display module further includes a common electrode, in the first liquid crystal display module, the control device applies, to the common electrode, a first voltage having a value based on the first arrangement information signal, in the second liquid crystal display module, the control device applies, to the common electrode, a second voltage having a value based on the second arrangement information signal, in the third liquid crystal display module, the control device applies, to the common electrode, a third voltage having a value based on the third arrangement information signal, and in the fourth liquid crystal display module, the control device applies, to the common electrode, a fourth voltage having a value based on the fourth arrangement information signal.

11. A multi-screen display device comprising:
a first liquid crystal display module;
a second liquid crystal display module; and
a host computer,
wherein each of the first liquid crystal display module and the second liquid crystal display module includes a liquid crystal display panel including a plurality of gate bus lines, a first gate driver connected to first ends of the plurality of gate bus lines, and a second gate driver connected to second ends of the plurality of gate bus lines, the first liquid crystal display module and the second liquid crystal display module are arranged to cause the first gate driver of the first liquid crystal display module and the first gate driver of the second liquid crystal display module to be arranged side by side in a direction orthogonal to a direction in which the plurality of gate bus lines extend, and the host computer drives the first gate driver and the second gate driver of the first liquid crystal display module to display an image on the first liquid crystal display module, and drives one of the first gate driver and the second gate driver and pauses the other of the first gate driver and the second gate driver of the second liquid crystal display module to display an image on the second liquid crystal display module.

12. The multi-screen display device according to claim 11, wherein each of the first liquid crystal display module and the second liquid crystal display module further includes a control device, the host computer generates a first image signal, a second image signal, a first arrangement information signal indicating arrangement information of the first liquid crystal display module in the multi-screen display device, and a second arrangement information signal indicating arrangement information of the second liquid crystal display module in the multi-screen display device, in the first liquid crystal display module, the control device receives the first image signal and the first arrangement information signal from the host computer, generates a first gate signal from the first image signal, and outputs the first gate signal to the first gate driver and the second gate driver based on the first arrangement information signal, and in the second liquid crystal display module, the control device receives the second image signal and the second arrangement information signal from the host computer, generates a second gate signal from the second image signal, and outputs the second gate signal to only one of the first gate driver and the second gate driver based on the second arrangement information signal.

13. A multi-screen display device comprising:
a first liquid crystal display module;
a second liquid crystal display module;
a third liquid crystal display module; and
a host computer,
wherein each of the first liquid crystal display module, the second liquid crystal display module, and the third liquid crystal display module includes a liquid crystal display panel including a plurality of gate bus lines, a first gate driver connected to first ends of the plurality of gate bus lines, and a second gate driver connected to second ends of the plurality of gate bus lines, the first liquid crystal display module, the second liquid crystal display module, and the third liquid crystal display module are arrayed in a direction in which the plurality of gate bus lines extend, and are arranged side by side to cause the second gate driver of the first liquid crystal display module to be adjacent to the first gate driver of the second liquid crystal display module, and to cause the second gate driver of the second liquid crystal display module to be adjacent to the first gate driver of the third liquid crystal display module, and the host computer drives the first gate driver and pauses the second gate driver of the first liquid crystal display module to display an image on the first liquid crystal display module, drives the first gate driver and the second gate driver of the second liquid crystal display module to display an image on the second liquid crystal display module, and drives the second gate driver and pauses the first gate driver of the third liquid crystal display module to display an image on the third liquid crystal display module.

14. The multi-screen display device according to claim 13, wherein each of the first liquid crystal display module, the second liquid crystal display module, and the third liquid crystal display module further includes a control device, the host computer generates a first image signal, a second image signal, and a third image signal, and a first arrangement information signal, a second arrangement information signal, and a third arrangement information signal indicating arrangement information of the first liquid crystal display module, the second liquid crystal display module, and the third liquid crystal display module in the multi-screen display device, respectively, in the first liquid crystal display module, the control device receives the first image signal and the first arrangement information signal from the host computer, generates a first gate signal from the first image signal, and outputs the first gate signal to the first gate driver based on the first arrangement information signal, in the second liquid crystal display module, the control device receives the second image signal and the second arrangement information signal from the host computer, generates a second gate signal from the second image signal, and outputs the second gate signal to the first gate driver and the second gate driver based on the second arrangement information signal, and in the third liquid crystal display module, the control device receives the third image signal and the third arrangement information signal from the host computer, generates a third gate signal from the third image signal, and outputs the third gate signal to the second gate driver based on the third arrangement information signal.

15. The multi-screen display device according to claim 13, further comprising:

a fourth liquid crystal display module, a fifth liquid crystal display module, and a sixth liquid crystal display module each including a plurality of gate bus lines, and a first gate driver connected to first ends of the plurality of gate bus lines, and a second gate driver connected to second ends of the plurality of gate bus lines, wherein the fourth liquid crystal display module, the fifth liquid crystal display module, and the sixth liquid crystal display module are arrayed in a direction in which the plurality of gate bus lines extend, and are arranged side by side to cause the second gate driver of the fourth liquid crystal display module to be adjacent to the first gate driver of the fifth liquid crystal display module, to cause the second gate driver of the fifth liquid crystal display module to be adjacent to the first gate driver of the sixth liquid crystal display module, and to cause the fourth liquid crystal display module, the fifth liquid crystal display module, and the sixth liquid crystal display module to be adjacent to the first liquid crystal display module, the second liquid crystal display module, and the third liquid crystal display module, respectively, and the host computer drives the first gate driver and pauses the second gate driver of the fourth liquid crystal display module to display an image on the fourth liquid crystal display module, drives the first gate driver and the second gate driver of the fifth liquid crystal display module to display an image on the fifth liquid crystal display module, and drives the second gate driver and pauses the first gate driver of the sixth liquid crystal display module to display an image on the sixth liquid crystal display module.

16. The multi-screen display device according to claim 15, wherein each of the first liquid crystal display module, the second liquid crystal display module, the third liquid crystal display module, the fourth liquid crystal display module, the fifth liquid crystal display module, and the sixth liquid crystal display module further includes a control device, the host computer generates a first image signal, a second image signal, a third image signal, a fourth image signal, a fifth image signal, and a sixth image signal, and a first arrangement information signal, a second arrangement information signal, a third arrangement information signal, a fourth arrangement information signal, a fifth arrangement information signal, and a sixth arrangement information signal indicating arrangement information of the first liquid crystal display module, the second liquid crystal display module, the third liquid crystal display module, the fourth liquid crystal display module, the fifth liquid crystal display module, and the sixth liquid crystal display module in the multi-screen display device, respectively, in the first liquid crystal display module, the control device receives the first image signal and the first arrangement information signal from the host computer, generates a first gate signal from the first image signal, and outputs the first gate signal to the first gate driver based on the first arrangement information signal, in the second liquid crystal display module, the control device receives the second image signal and the second arrangement information signal from the host computer, generates a second gate signal from the second image signal, and outputs the second gate signal to the first gate driver and the second gate driver based on the second arrangement information signal, in the third liquid crystal display module, the control device receives the third image signal and the third arrangement information signal from the host computer,
generates a third gate signal from the third image signal, and
outputs the third gate signal to the second gate driver based on the third arrangement information signal,
in the fourth liquid crystal display module, the control device
receives the fourth image signal and the fourth arrangement information signal from the host computer,
generates a fourth gate signal from the fourth image signal, and
outputs the fourth gate signal to the first gate driver based on the fourth arrangement information signal,
in the fifth liquid crystal display module, the control device
receives the fifth image signal and the fifth arrangement information signal from the host computer,
generates a fifth gate signal from the fifth image signal, and
outputs the fifth gate signal to the first gate driver and the second gate driver based on the fifth arrangement information signal, and
in the sixth liquid crystal display module, the control device
receives the sixth image signal and the sixth arrangement information signal from the host computer,
generates a sixth gate signal from the sixth image signal, and
outputs the sixth gate signal to the second gate driver based on the sixth arrangement information signal.

* * * * *